US006005053A

United States Patent [19]
Parikh et al.

[11] Patent Number: 6,005,053
[45] Date of Patent: *Dec. 21, 1999

[54] POLYOLEFIN ELASTOMER BLENDS EXHIBITING IMPROVED PROPERTIES

[75] Inventors: Deepak R. Parikh; Pak-Wing S. Chum; Rajen M. Patel; Klye G. Kummer; Pradeep Jain, all of Lake Jackson; Thomas J. McKeand, Jr., Freeport; Ronald P. Markovich, Houston, all of Tex.; Timothy E. Clayfield, Geneva, Switzerland; Wasif Ahmed Khan, Fresno, Tex.

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/784,681

[22] Filed: Jan. 22, 1997

Related U.S. Application Data

[60] Provisional application No. 60/010,303, Jan. 22, 1996, and provisional application No. 60/013,430, Mar. 14, 1996.

[51] Int. Cl.$^6$ .................................................. C08L 33/02
[52] U.S. Cl. ............................ 525/221; 525/222; 525/227
[58] Field of Search .................................. 525/221, 222, 525/227

[56] References Cited

U.S. PATENT DOCUMENTS

| | | | |
|---|---|---|---|
| 3,280,220 | 10/1966 | Nelson | 260/897 |
| 3,842,147 | 10/1974 | Tomatu | 525/221 |
| 3,869,422 | 3/1975 | Dawes | 525/221 |
| 3,914,342 | 10/1975 | Mitchell | 260/897 |
| 3,970,722 | 7/1976 | Ogihara | 525/221 |
| 4,102,855 | 7/1978 | Kuan | 525/222 |
| 4,251,584 | 2/1981 | Engelen | 525/221 |
| 4,259,468 | 3/1981 | Kajiura et al. | 526/283 |
| 4,335,034 | 6/1982 | Zuckerman et al. | 524/423 |
| 4,339,507 | 7/1982 | Kurtz et al. | 428/522 |
| 4,403,007 | 9/1983 | Coughlin | 428/95 |
| 4,429,079 | 1/1984 | Shibata et al. | 525/240 |
| 4,438,238 | 3/1984 | Fukushima et al. | 525/240 |
| 4,461,873 | 7/1984 | Bailey et al. | 525/240 |
| 4,525,257 | 6/1985 | Kurtz et al. | 204/159.2 |
| 4,542,886 | 9/1985 | Yoshimura et al. | 264/22 |
| 4,584,348 | 4/1986 | Nagano | 525/222 |
| 4,614,764 | 9/1986 | Colombo et al. | 525/72 |
| 4,670,349 | 6/1987 | Nakagawa | 525/222 |
| 4,737,547 | 4/1988 | White | 525/193 |
| 4,782,110 | 11/1988 | Wolfe | 525/221 |
| 4,786,697 | 11/1988 | Cozewith et al. | 526/88 |
| 4,798,081 | 1/1989 | Hazlitt et al. | 73/53 |
| 4,861,834 | 8/1989 | Audureau et al. | 525/194 |
| 4,874,820 | 10/1989 | Cozewith et al. | 525/240 |
| 4,937,299 | 6/1990 | Ewen et al. | 526/119 |
| 4,939,217 | 7/1990 | Stricklen | 526/114 |
| 4,997,720 | 3/1991 | Bourbonais | 525/221 |
| 5,089,321 | 2/1992 | Chum et al. | 428/218 |
| 5,189,106 | 2/1993 | Morimoto et al. | 525/240 |
| 5,210,142 | 5/1993 | Kale et al. | 525/240 |
| 5,272,236 | 12/1993 | Lai et al. | 526/348.5 |
| 5,278,272 | 1/1994 | Lai et al. | 526/348.5 |
| 5,371,143 | 12/1994 | Novak et al. | 525/88 |
| 5,382,631 | 1/1995 | Stehling et al. | 525/240 |
| 5,408,004 | 4/1995 | Lai et al. | 525/240 |
| 5,464,905 | 11/1995 | Tsutsui et al. | 525/240 |
| 5,470,993 | 11/1995 | Devore et al. | 556/11 |
| 5,492,760 | 2/1996 | Sarma et al. | 428/378 |
| 5,500,260 | 3/1996 | Halle et al. | 428/35.7 |
| 5,589,539 | 12/1996 | Wagner et al. | 525/553 |
| 5,593,747 | 1/1997 | Georgelos | 428/36.7 |

FOREIGN PATENT DOCUMENTS

| | | | |
|---|---|---|---|
| 0584 927 A2 | 3/1994 | European Pat. Off. | C08L 23/04 |
| 0634 443 A2 | 7/1994 | European Pat. Off. | C08J 5/18 |
| 0614 938 A1 | 8/1994 | European Pat. Off. | C08L 23/09 |
| 0721 967 A1 | 7/1996 | European Pat. Off. | C08J 5/18 |
| 7-207054 | 8/1995 | Japan | C08J 9/06 |
| 91/08262 | 6/1991 | WIPO | C08L 43/04 |
| 93/13143 | 7/1993 | WIPO | C08F 10/02 |
| 94/06858 | 3/1994 | WIPO | C08L 23/04 |
| 94/17112 | 8/1994 | WIPO | C08F 210/02 |
| 95/01250 | 1/1995 | WIPO | B29C 47/00 |
| 95/09199 | 4/1995 | WIPO | C08L 23/08 |
| 95/29197 | 11/1995 | WIPO | C08F 255/02 |
| 96/12762 | 5/1996 | WIPO | C08L 23/04 |
| 97/12934 | 4/1997 | WIPO | C08L 23/16 |
| 97/33921 | 8/1997 | WIPO | C08J 2/00 |

OTHER PUBLICATIONS

Kurian, et al., "Effect of Controlled Crosslinking on tthe Mechanical and Rheological Properties of HDPE/LLDPE Blends", 1992, pp. 113–116, Eur. Polym. J., vol. 28, No. 1.

Phillips, P.J., et al., Crosslinking of Homogeneous Polyethylenes, May 1–4, 1994, Society of Plastics Engineers Conference Proceedings. vol. II.

International Search Report (3 sheets) by EPO as ISA dated Jun. 3, 1997 in International Application No. PCT/US97/01180.

*Primary Examiner*—Paul R. Michl

[57] ABSTRACT

Polymer mixtures are disclosed which comprise at least one homogeneously branched ethylene polymer (A) and at least one ethylene polymer (B) having a crystallinity which is at least 7% greater than the crystallinity of polymer (A) with certain provisos. A process for making a molded article using the disclosed polymer mixtures is disclosed as well as films, film layers, coatings and molded articles formed from those mixtures. These mixtures have several advantages over polymer compositions of the prior art, including improved properties at elevated temperatures such as improved softening point under load, improved hardness, improved toughness, improved 100% modulus of elasticity, improved compression set, improved ability to prevent oil bleed out at lower temperatures when the mixture contains oil and reduced injection molding cycle time. The mixtures retain their performance advantages even when substantial amounts of additives such as oil and filler are incorporated into the mixture. The mixtures may also be crosslinked after they are formed into the shape of an article to form vulcanized elastomeric products. The polymer mixtures have utility in a variety of applications.

26 Claims, 16 Drawing Sheets

POLYOLEFIN ELASTOMER BLENDS EXHIBITING IMPROVED PROPERTIES

CROSS-REFERENCE TO RELATED APPLICATIONS

This application claims priority from U.S. provisional application 60/010,303, filed Jan. 22, 1996, and from U.S. provisional application 60/013,430, filed Mar. 14, 1996.

BACKGROUND OF THE INVENTION

1. Field of the Invention

This invention relates to ethylene polymer compositions, processes for making such polymer compositions, and molded articles made from such compositions.

2. Description of Related Art

Ethylene homopolymers and interpolymers are known classes of thermoplastic polymers, each having many members. They are prepared by homopolymerizing ethylene or interpolymerizing (e.g., copolymerizing) ethylene with one or more vinyl- or diene-based comonomers, e.g., α-olefins of 3 to about 20 carbon atoms, vinyl esters, vinyl acids, styrene-based monomers, monomers containing two or more sites of ethylenic unsaturation, etc., using known copolymerization reactions and conditions.

Although ethylene homopolymers and interpolymers are known for their strength and processability, experiments continue to be conducted which explore the outer limits of these properties. One result of this research was the development of substantially linear ethylene polymers (SLEPs) which are less susceptible to melt fracture or formation of extrudate defects during high pressure, high speed extrusion than are conventional polyethylenes. SLEPs possess high processibility and strength without requiring additives.

Thermoplastic elastomers are known materials possessing both elastomeric and thermoplastic characteristics. These materials are becoming increasingly popular in industrial applications because of their ease of fabrication and general good physical properties. Thermoplastic elastomers are of two main types, (1) block and graft copolymers containing soft and hard polymer chain segments, and (2) blends of certain elastomers and thermoplastics. Examples of the latter class include blends of ethylene/propylene rubber (EDPM) with polyolefin thermoplastics, such as polypropylene or polyethylene.

Although the various types of ethylene polymers have found application in a wide range of environments, in certain of these environments improvement is both possible and desirable. For example, applications requiring good performance at elevated temperatures (i.e., temperatures above room temperature) abound. Relevant properties under these conditions include softening point under load, toughness, 100% modulus of elasticity, and compression set. Processability improvements are also desirable, e.g. certain ethylene polymers require a long cooling cycle time in injection molding applications. The need for thermoplastic elastomers with increased high temperature performance that are easy to process is expressed, for example, in U.S. Pat. No. 5,371,143. Polymers or polymer blends which possess a high softening point under load, greater toughness, higher 100% modulus of elasticity, lower compression set, and reduced cycle time are thus desired.

SUMMARY OF THE INVENTION

According to this invention, these and other desired results are achieved with a polymer mixture comprising:

(A) at least one homogeneously branched ethylene polymer having a crystallinity in the range from 0 to 50% and (B) at least one ethylene polymer having a crystallinity in the range from 5 to 80% which is at least 7% greater than the crystallinity of component (A) provided that (1) (a) when component (A) has a crystallinity greater than or equal to 21.5% and a melt index less than or equal to 10 dg/min., component (B) is a homogeneous polymer and (b) when the crystallinity of component (B) is greater than 21.5%, component (B) is present in an amount less than 40 wt % (2) the number average molecular weight of component (B) is greater than or equal to the number average molecular weight of polymer (A), (3) component (B) comprises at least one interpolymer of ethylene with at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof, or (4) at least one of the ethylene polymer components of the polymer mixture comprises an ultra-low molecular weight ethylene polymer having a crystallinity from 0 to 80%, a melt viscosity at 350° F. up to 8200 cp and a molecular weight distribution from 1.5 to 2.5, wherein the polymer mixture has an overall crystallinity in the range from 6 to 50% and when component (B) does not comprise interpolymer (B)(3) and none of the ethylene polymer components of the polymer mixture comprise the ultra-low molecular weight ethylene polymer, the polymer mixture has a molecular weight distribution not greater than 3 when the overall crystallinity is greater than or equal to 21.5%.

This polymer mixture may further comprise:

(C) at least one homogeneously branched ethylene polymer having a crystallinity between the crystallinities of components (A) and (B) and having a crystallinity which differs from the crystallinities of components (A) and (B) by at least 7%.

Another aspect of this invention is a process for injection molding a polyolefin having a reduced cycle time comprising:

(A) heating a polymer mixture according to the present invention as described above to a temperature suitable for injection molding;

(B) injecting the polymer mixture of step (A) into a mold to form the molded article; and (C) removing from the mold the molded article formed in step (B).

This process may optionally include:

(B1) cooling the molded article of step (B) and/or (B2) crosslinking the molded article of step (B).

Yet another aspect of this invention is the molded article obtained by molding the polymer mixture according to the present invention.

DETAILED DESCRIPTION OF THE INVENTION

1. Basic Definitions

Figure 1:
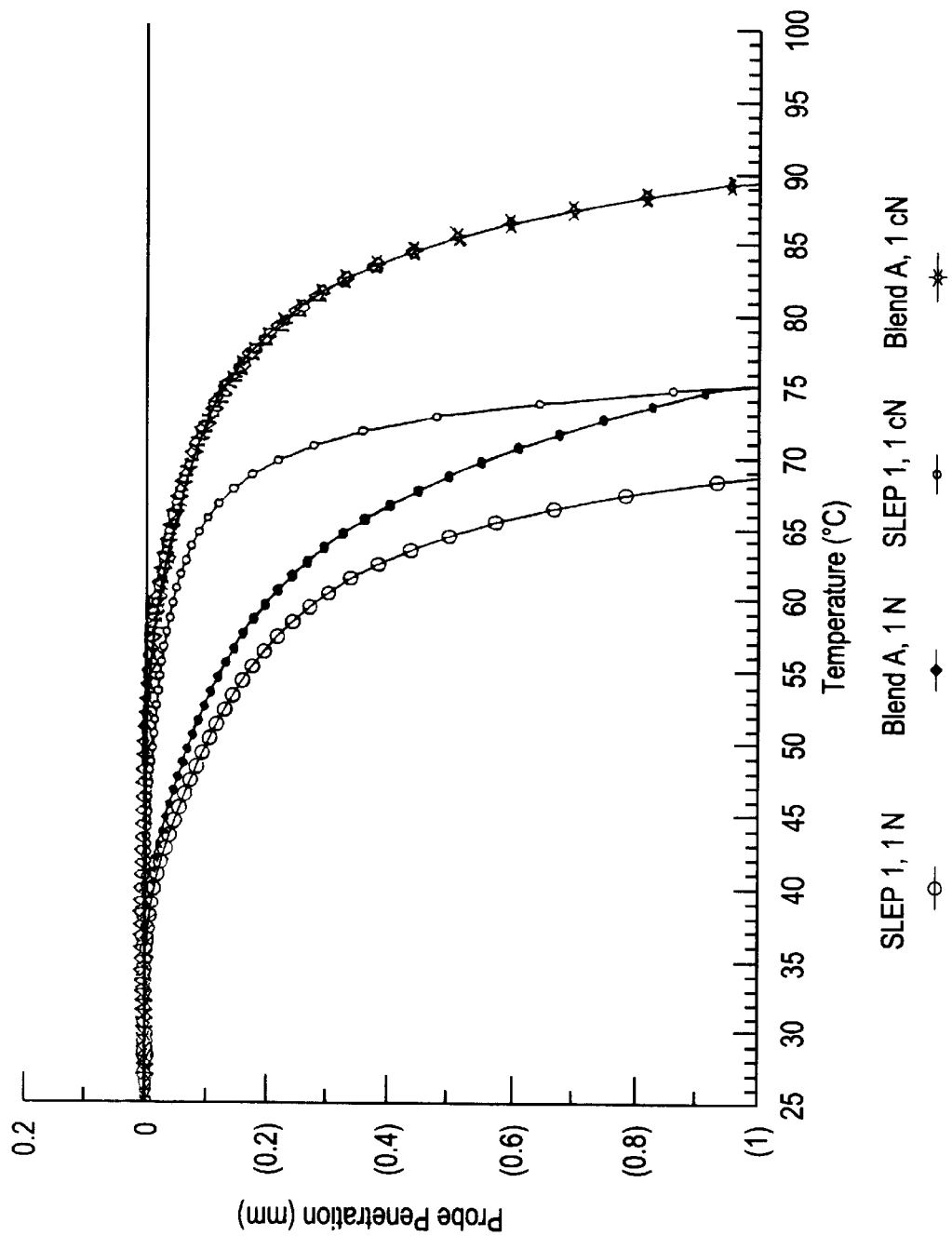
FIG. 1 shows two pairs of probe penetration versus temperature plots, one pair at a constant probe force of 1 Newton (N) and the other pair at a constant probe force of 0.1 N, for a single substantially linear ethylene 1-octene copolymer commercially available from Dow Chemical Company under the trademark EG 8100 (SLEP 1) and an 80:20 blend (blend A) of a low crystallinity (9.2%) substantially linear ethylene 1-octene copolymer (SLEP 2) with a higher crystallinity (33.2%) substantially linear ethylene 1-octene copolymer (SLEP 3), blend A having the same crystallinity (14.0%) as the single polymer, SLEP 1. Probe penetration was determined using the same conditions for each sample, which included using a flat tip probe having a 1 mm tip diameter, heating the polymer sample under a nitrogen atmosphere at a rate of 5° C./min (starting at room temperature), and measuring probe penetration relative to temperature.

Unless indicated to the contrary, all parts, percentages and ratios are by weight. The expression "up to" when used to specify a numerical range includes any value less than or equal to the numerical value which follows this expression. The expression "cc" stands for "cubic centimeters".

The term "polymer" means a compound prepared by polymerizing monomers, whether of the same or a different type. The generic term polymer thus embraces the term "homopolymer", usually employed to refer to polymers prepared from only one type of monomer, and the term "interpolymer", as defined hereinafter.

The term "interpolymer" means polymers prepared by the polymerization of at least two different types of monomers. The generic term "interpolymer" thus includes the term "copolymers", which is usually employed to refer to polymers prepared from two different monomers, as well as to polymers prepared from more than two different types of monomers.

The term "homogeneous" polymers are ethylene interpolymers in which any comonomer is randomly distributed within a given interpolymer molecule and substantially all of the interpolymer molecules have the same ethylene/comonomer ratio within that interpolymer. Homogeneous polymers generally are characterized as having a single melting peak between –30° C. and 150° C., as determined by differential scanning calorimetry (DSC). The single melting peak may be relatively broad, such as is the case when an ethylene polymer having a crystallinity less than 36% is employed. The single melting peak may be sharp, such as is the case when an ethylene polymer having a crystallinity of at least 36% is employed.

Homogeneous polymers will also typically have a molecular weight distribution, $M_w/M_n$, less than or equal to 3 (when the density of the interpolymer is less than about 0.960 g/cc) preferably less than or equal to 2.5.

In addition or in the alternative, the homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The SCBDI of a polymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the homogeneous linear and for the substantially linear ethylene/α-olefin polymers used in the present invention is preferably greater than 50 percent.

Heterogenous polymers are ethylene/α-olefin interpolymers characterized as having a linear backbone and a DSC melting curve having a distinct melting peak greater than 115° C. attributable to a high density fraction. Heterogeneous interpolymers will typically have an $M_w/M_n$ greater than 3 (when the density of the interpolymer is less than about 0.960 g/cc) and will typically have a CDBI less than or equal to 50, indicating that such interpolymers are a mixture of molecules having differing comonomer contents and differing amounts of short chain branching.

The crystallinity in reference to an ethylene polymer is a well known property of ethylene polymers. Various techniques have been developed to measure ethylene polymer crystallinity.

When the ethylene polymer is derived exclusively from hydrocarbon monomers (e.g., non-functionalized ethylene α-olefin interpolymers), the crystallinity can be determined from the density of the polymer using the following equation:

$$\%C = (\rho - \rho_a)/\rho(\rho_c - \rho_a) \times 100$$

in which %C is the percent crystallinity of the ethylene polymer, $\rho_a$ is the density of an ethylene polymer which has 0% crystallinity (i.e., 100% amorphous) at room temperature (0.852 g/cc.), $\rho_c$ represents the density of an ethylene polymer at 100% crystallinity at room temperature (1.000 g/cc.) and p represents the density of the polymer for which the percent crystallinity is being determined. Density may be determined according to ASTM D792 in which the samples are annealed at ambient temperature for 24 hours before the measurement is taken.

Another method for determining the percent crystallinity of an ethylene polymer relies upon differential scanning calorimetry (DSC). The percent crystallinity may be calculated with the equation:

$$\%C = (A/292 \text{ J/g}) \times 100,$$

in which %C represents the percent crystallinity and A represents the heat of fusion of the ethylene in Joules per gram (J/g).

Another method by which crystallinity can be determined is through the use of wide-angle X-ray diffraction (WAXD). The percent crystallinity may be calculated with the following equation:

$$\%C = (A_c/(A_a + A_c)) \times 100,$$

in which %C again represents percent crystallinity, $A_c$ represents the total area under the crystalline peaks of the WAXD pattern and $A_a + A_c$ represents the total area under the WAXD pattern, $A_a$ representing the amorphous peaks.

When the ethylene polymer is a nonfunctionalized ethylene polymer, the method for determining percent crystallinity based on polymer density is preferred, and for any ethylene polymer the method based on DSC is preferred over the method based on WAXD.

The term "softening point under load" (SPUL) means the temperature at which probe penetration of 1 mm into the polymer is achieved using a device capable of applying a constant force of 1 N to a flat tip probe having a diameter of 1 mm while raising the temperature of the polymer from 25° C. at a rate of 5° C./minute under a nitrogen atmosphere. One such device is a ThermoMechanical Analyzer (TMA) such as Model TMA-7 made by the Perkin-Elmer Instrument Company. The procedure for conducting this test is described in more detail in the Examples section below.

The softening point can be approximated by measuring the temperature at which the Shore A hardness of the polymer, or polymer blend, is about 45.

2. Components (A), (B), and (C)

Component (A) is at least one homogeneous ethylene polymer, preferably at least one substantially linear ethylene polymer (SLEP), having a crystallinity of 0% up to 50%. The crystallinity of (A) is preferably at least 2% and preferably up to 30%, more preferably up to 20%, and even more preferably up to 15%. Component (A) is preferably of a type obtainable by using a metallocene catalyst.

Component (B) is at least one homogeneous or heterogeneous ethylene polymer having a crystallinity of at least 5%, preferably at least 10%, more preferably at least 21.5% and preferably up to 80%, more preferably up to 60%, even more preferably up to 50%. However, when component (A) has a crystallinity greater than or equal to 21.5% and a melt index (MI)≦10 dg/min., component (B) is preferably a homogeneous polymer. SLEPs, linear low density polyethylenes (LLDPEs), low density polyethylenes (LDPEs), high density polyethylenes (HDPEs), ethylene terpolymers and ethylene copolymers with carboxylic acids, esters and salts, such as ethylene vinyl acetate (EVA), ethylene acrylic acid (EAA), etc., are among the ethylene polymers that may be used as component (B). SLEPs are preferred.

Optional component (C) is at least one homogeneous ethylene polymer, preferably at least one SLEP, having a crystallinity of at least 7%, preferably at least 14%, up to 73%.

Components (A), (B), and (C) are preferably sufficiently compatible with each other that they are miscible in each other when in the molten form. The polymer mixture of this invention is preferably a single phase mixture when in the molten form.

Homogeneous Ethylene Polymers

The homogeneous polyethylenes that can be used as components (A), (B), and (C) of this invention fall into two broad categories, the linear homogeneous polyethylenes and the substantially linear homogeneous polyethylenes. Both are known.

Homogeneous linear ethylene polymers have long been commercially available. As exemplified in U.S. Pat. No. 3,645,992 to Elston, homogeneous linear ethylene polymers can be prepared in conventional polymerization processes using Ziegler-type catalysts such as, for example, zirconium and vanadium catalyst systems. U.S. Pat. No. 4,937,299 to Ewen et al. and U.S. Pat. No. 5,218,071 to Tsutsui et al. disclose the use of metallocene catalysts, such as catalyst systems based on hafnium, for the preparation of homogeneous linear ethylene polymers. Homogeneous linear ethylene polymers are typically characterized as having a molecular weight distribution, $M_w/M_n$, of about 2. Commercially available examples of homogeneous linear ethylene polymers include those sold by Mitsui Petrochemical Industries as Tafmer™ resins and by Exxon Chemical Company as Exact™ resins.

The substantially linear ethylene polymers (SLEPs) are homogeneous polymers having long chain branching. They are disclosed in U.S. Pat. Nos. 5,272,236 and 5,278,272, the disclosures of which are incorporated herein by reference. SLEPs which are available from The Dow Chemical Company as polymers made by the Insite™ Process and Catalyst Technology such as Affinity™ polyolefin plastomers (POPs) and as Engage™ polyolefin elastomers (POEs). Specific examples include polymer products designated EG 8100, EG 8150, PF 1140, CL 8003, PL 1880, SM 1300 and SM 8400, each of which is commercially available from The Dow Chemical Corporation. SLEPs can be prepared via the solution, slurry, or gas phase, preferably solution phase, polymerization of ethylene and one or more optional α-olefin comonomers in the presence of a constrained geometry catalyst, such as is disclosed in European Patent Application 416,815-A, incorporated herein by reference. The constrained geometry catalysts are described in more detail later.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

"Long chain branching" (LCB) means a chain length of at least 6 carbons, above which the length cannot be distinguished using $^{13}C$ nuclear magnetic resonance spectroscopy. Each long chain branch has the same comonomer distribution as the polymer backbone and can be as long as the polymer backbone to which it is attached.

The presence of long chain branching can be determined in ethylene polymers by using $^{13}C$ nuclear magnetic resonance (NMR) spectroscopy and is quantified using the method described by Randall (Rev. Macromol. Chem. Phys., C.29, V. 2&3, p. 285–297), the disclosure of which is incorporated herein by reference.

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J.Chem. Phys., 17,1301 (1949) and Rudin, A., *Modern Methods of Polymer Characterization*, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous SLEP samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$, Melt Index) as a function of Log(GPC Weight Average Molecular Weight) as determined by GPC-DV illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

For ethylene/α-olefin interpolymers, the long chain branch is longer than the short chain branch that results from the incorporation of the α-olefin(s) into the polymer backbone. The empirical effect of the presence of long chain branching in the substantial linear ethylene/α-olefin interpolymers used in the invention is manifested as enhanced rheological properties which are quantified and expressed herein in terms of gas extrusion rheometry (GER) results and/or melt flow, $I_{10}/I_2$, increases.

In contrast to the term "substantially linear", the term "linear" means that the polymer lacks measurable or demonstrable long chain branches, i.e., the polymer is substituted with an average of less than 0.01 long chain branch/1000 carbons.

SLEPs are further characterized as having:
(a) a melt flow ratio, $I_{10}/I_2 \geq 5.63$,
(b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density within ten percent of the SLEP and wherein the respective critical shear rates of the SLEP and the linear ethylene polymer are measured at the same melt temperature using a gas extrusion rheometer, and
(d) a single differential scanning calorimetry, DSC, melting peak between −30 and 150° C.

Determination of the critical shear rate and critical shear stress in regards to melt fracture as well as other rheology properties such as Theological processing index (PI), is performed using a gas extrusion rheometer (GER). The gas extrusion rheometer is described by M. Shida, R. N. Shroff and L. V. Cancio in *Polymer Engineering Science, Vol.* 17, No. 11, p. 770 (1977), and in "Rheometers for Molten Plastics" by John Dealy, published by Van Nostrand Reinhold Co. (1982) on pp. 97–99, both of which are incorporated by reference herein in their entirety. GER experiments are performed at a temperature of 190° C., at nitrogen pressures between 250 to 5500 psig using a 0.0754 mm diameter, 20:1 L/D die with an entrance angle of 180°. For the SLEPs described herein, the PI is the apparent viscosity (in kpoise) of a material measured by GER at an apparent shear stress of $2.15 \times 10^6$ dyne/cm$^2$. The SLEPs for use in the invention includes ethylene interpolymers and have a PI in the range of 0.01 kpoise to 50 kpoise, preferably 15 kpoise or less. The SLEPs used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the SLEPs.

The rheological behavior of SLEPs can also be characterized by the Dow Rheology Index (DRI), which expresses a polymer's "normalized relaxation time as the result of long chain branching." (See, S. Lai and G. W. Knight *ANTEC '93 Proceedings*, INSITE™ Technology Polyolefins (SLEP)—New Rules in the Structure/Rheology Relationship of Ethylene α-Oefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the SLEPs useful in this invention, DRI is preferably at least 0.1, and especially at least 0.5, and most especially at least 0.8. DRI can be calculated from the equation:

$$DRI = (3652879 * \tau_o^{1.00649}/\eta_o - 1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e., $$\eta/\eta_o = 1/(1 + (\gamma^* \tau_o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190° C. Specific material determinations can be performed from 140 to 190° C. as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. The critical shear rate at the onset of surface melt fracture for the SLEPs is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the SLEPs, especially those having a density >0.910 g/cc, used in the invention is greater than $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

Preferably, the SLEP will be characterized by its critical shear rate when used as the first ethylene polymer of the invention and by its critical shear stress when used as the second ethylene polymer of the invention.

The SLEPs used in the invention are also characterized by a single DSC melting peak. The single melting peak is determined using a differential scanning calorimeter standardized with indium and deionized water. The method involves 3–7 mg sample sizes, a "first heat" to about 180° C.

which is held for 4 minutes, a cool down at 10° C./min. to −30° C. which is held for 3 minutes, and heat up at 10° C./min. to 140° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can separately determined by specific integration of its associated area under the heat flow vs. temperature curve.

The SLEPs are analyzed by gel permeation chromatography (GPC) on a Waters 150° C. high temperature chromatographic unit equipped with differential refractometer and three columns of mixed porosity. The columns are supplied by Polymer Laboratories and are commonly packed with pore sizes of $10^3$, $10^4$, $10^5$ and $10^6$. The solvent is 1,2,4-trichlorobenzene, from which 0.3 percent by weight solutions of the samples are prepared for injection. The flow rate is 1.0 ml/min, unit operating temperature is 140° C., and the injection size is 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the equation $M_{polyethylene} = a \cdot (M_{polystyrene})^b$.

In this equation, a=0.4316 and b=1.0. Weight average molecular weight, $M_w$, is calculated in the usual manner according to the formula $$M_w = \Sigma(w_i \times M_i)$$

where $w_i$ and $M_i$ are the weight fraction and molecular weight, respectively, of the $i^{th}$ fraction eluting from the GPC column.

SLEPs are known to have excellent processability, despite having a relatively narrow molecular weight distribution (i.e., the $M_w/M_n$ ratio is typically less than 3.5). Moreover, unlike homogeneously and heterogeneously branched linear ethylene polymers, the melt flow ratio ($I_{10}/I_2$) of SLEPs can be varied independently of the molecular weight distribution, $M_w/M_n$.

Accordingly, the first ethylene polymer, Component (A), of the inventive polymer mixtures is preferably a SLEP.

Heterogeneous Ethylene Polymers

The heterogeneous polyethylenes that can be used in the practice of this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their methods of preparation. Heterogeneous linear ethylene polymers are available from The Dow Chemical Company as Dowlex™ LLDPE and as Attane™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. 4,950,541 and the patents to which it refers, all of which are incorporated herein by reference.

Ethylene Interpolymers

The ethylene polymers useful as components (A), (B), and (C) can independently be interpolymers of ethylene and at least one α-olefin. Suitable α-olefins are represented by the following formula:

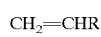

in which R is a hydrocarbyl radical. The comonomers which form a part of component (A) may be the same as or different from the comonomers which form parts of polymers (B) and (C) of the inventive mixture and the comonomer which forms a part of component (B) may be the same or different from the comonomers which form parts of polymers (A) and (C).

R generally has from one to twenty carbon atoms. Suitable α-olefins for use as comonomers in a solution, gas phase or slurry polymerization process or combinations thereof include 1-propylene, 1-butene, 1-isobutylene, 1-pentene, 1-hexene, 4-methyl-1-pentene, 1-heptene and 1-octene, as well as other monomer types such as tetrafluoroethylene, vinyl benzocyclobutane, 1,4-hexadiene, 1,7-octadiene, and cycloalkenes, e.g. cyclopentene, cyclohexene, cyclooctene, norbornene (NB), and ethylidene norbornene (ENB)). Preferably, the α-olefin will be 1-butene, 1-pentene, 4-methyl-1-pentene, 1-hexene, 1-heptene, 1-octene, NB or ENB, or mixtures thereof. More preferably, the α-olefin will be 1-hexene, 1-heptene, 1-octene, or mixtures thereof. Most preferably, the α-olefin will be 1-octene.

Ethylene/α-olefin/diene terpolymers may also be used as elastomeric polymers in this invention. Suitable α-olefins include the α-olefins described above as suitable for making ethylene α-olefin copolymers. The dienes suitable as monomers for the preparation of such terpolymers are typically non-conjugated dienes having from 6 to 15 carbon atoms. Representative examples of suitable non-conjugated dienes that may be used to prepare the terpolymer include:

a) Straight chain acyclic dienes such as 1,4-hexadiene, 1,5-heptadiene, and 1,6-octadiene;

b) branched chain acyclic dienes such as 5-methyl-1, 4-hexadiene, 3,7-dimethyl-1-6-octadiene, and 3,7-dimethyl-1,7-octadiene;

c) single ring alicyclic dienes such as 4-vinylcyclohexene, 1-allyl-4-isopropylidene cyclohexane, 3-allylcyclopentene, 4-allylcyclohexene, and 1-isopropenyl4-butenylcyclohexane;

d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6-methyl-2-norbornene, 5-methylene-6, 6-dimethyl-2-norbornene, 5-propenyl-2-norbornene, 5-(3-cyclopentenyl)-2-norbornene, 5-ethylidene-2-norbornene, 5-cyclohexylidene-2-norbornene, etc.

The preferred dienes are selected from the group consisting of 1,4-hexadiene, dicyclopentadiene, 5-ethylidene-2-norbornene, 5-methylene-2-norbornene, 7-methyl-1,6-octadiene, piperylene, 4-vinylcyclohexene, etc.

The preferred terpolymers for the practice of the invention are terpolymers of ethylene, propylene and a non-conjugated diene (EPDM). Such terpolymers are commercially available. Ethylene/α-olefin/diene terpolymers are useful when it is desired to make elastomeric polymer blends vulcanizable with the well known sulfur compound vulcanization process.

Ultra-low Molecular Weight Ethylene Polymers

Ethylene polymers having an ultra-low molecular weight can also be used as component (A), (B), and/or (C) of this invention. In one embodiment, it is contemplated that one or more of components (A), (B), or (C) may comprise an ultra-low molecular weight ethylene polymer characterized as having a $M_n$ less than 11,000 and an $M_w/M_n$ of from 1.5 to 2.5. These ultra-low molecular weight ethylene polymers may have a greater degree of crystallinity than corresponding higher molecular weight materials. In certain instances, the ultra-low molecular weight ethylene polymer preferred for component (A), (B), and/or (C) is an ultra-low molecular weight semicrystalline ethylene/α-olefin interpolymer having a density less than 0.900 g/cc and characterized as having lamella greater than 40 nanometers in length when viewed using electron transmission microscopy.

These ultra-low molecular weight ethylene polymers are either homopolymers or interpolymers of ethylene with at least one ethylenically unsaturated monomer, conjugated or nonconjugated diene, polyene, etc. When these ultra-low molecular weight ethylene polymer are interpolymers, preferred comonomers include the $C_3$–$C_{20}$ α-olefins, especially propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

In some cases, ultra-low molecular weight ethylene polymers suitable for use in the polymer mixtures of this invention have a $M_n$ less than 10,000, and using the process for making the ultra-low molecular weight ethylene polymers described below, useful ethylene polymers having a $M_n$ less than 5,000 may be obtained. However, typically the $M_n$ of these polymers will be greater than 2,500.

$M_n$ is related to the viscosity at 350° F. of the ultra-low molecular weight ethylene polymers. The ultra-low molecular weight ethylene polymers are characterized by a melt viscosity at 350° F. of less than about 8200, in some cases less than 6000, with melt viscosities less than about 600 being easily attained with the process for making these polymers described below.

These ultra-low molecular weight ethylene polymers are homogeneous and have a narrow molecular weight distribution ($M_w/M_n$). For these polymers, the $M_w/M_n$ is in the range from about 1.5 to about 2.5, in some cases in the range from 1.8 to 2.2. The ultra-low molecular weight polymers have a polymer backbone which is optionally substituted with up to 3 long chain branches per 1000 carbons.

Further, the $M_n$ of the ultra-low molecular weight ethylene polymers is related to the melt index ($I_2$). For the ultra-low molecular weight ethylene polymers of the invention, melt index is not measured, but is calculated from viscosity correlations. The ultra-low molecular weight ethylene polymers are characterized by a calculated melt index ($I_2$) at 190° C. greater than 1000 dg/min., in some cases greater than 1300 dg/min., with these polymers having calculated melt indices of at least 10,000 dg/min. being easily attained.

The ultra-low molecular weight ethylene polymers will typically have a density of from 0.850 to 0.970 g/cc. The density employed is a function of the end use contemplated. For instance, when the polymer is intended as a wax substitute densities greater than 0.910, preferably greater than 0.920, g/cc are appropriate. In contrast, when the polymer is intended as the strength-imparting component densities less than 0.900, preferably less than 0.895, g/cc are appropriate. When the ultra-low molecular weight polymer is an interpolymer of ethylene with an aromatic comonomer, such as styrene, the density will be less than 1.10 g/cc.

The ultra-low molecular weight ethylene polymers of the invention are characterized as being non-pourable. That is, the ultra-low molecular weight ethylene polymers of the invention are characterized as having a pour point greater than −30° C. as determined by ASTM D-97. Preferably, the pour point of the ultra-low molecular weight ethylene polymers will be greater than room temperature (25° C.), and more preferably greater than 50° C.

The ultra-low molecular weight ethylene polymers have a crystallinity from 0% to 80% and thus may be selected according to the preferred density ranges of components (A), (B) and (C).

Homogeneous ultra-low molecular weight ethylene/α-olefin interpolymers may be advantageous in certain applications of this invention, as they lead to a low polymer and formulation viscosity but are characterized by a peak crystallization temperature which is greater than that of corresponding higher molecular weight materials of the same density.

The ultra-low molecular weight ethylene polymers may be obtained by reacting ethylene and at least one ethylenically unsaturated comonomer at a reaction temperature of at least 80° C. in the presence of a constrained geometry catalyst. The reactor temperature is typically in the range from 100° C. to 250° C., preferably from 100° C. to 150° C., with temperatures at the higher end of the range favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired plymer has an $I_2$ of 1 dg/min., the hydrogen:ethylene molar ratio will typically be in the range from 0.45:1 to 0.7:1. The upper limit of the hydrogen:ethylene molar ratio is about 2.2–2.5:1.

Generally the polymerization process is carried out with a differential pressure of ethylene of from about 10 to about 1000 psi (70 to 7000 kPa), most preferably from about 40 to about 400 psi (30 to 300 kPa). The polymerization is generally conducted at a temperature of from 100 to 250° C., preferably from 100 to 150° C., and most preferably from greater than 1 10 to 140° C.

In general, the ultra-low molecular weight ethylene/cc-olefins useful in the polymer mixtures of this invention may be polymerized at conditions for Ziegler-Natta or Kaminsky-Sinn type polymerization reactions, that is, reactor pressures ranging from atmospheric to 3500 atmospheres.

Suspension, solution, slurry, gas phase, solid state powder polymerization or other process condition may be employed if desired using catalysts such as the constrained geometry catalysts described in U.S. Pat. Nos. 5,272,236 and 5,278, 272 and further described below. A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30. In most polymerization reactions the molar ratio of catalyst:polymerizable compounds employed is from $10^{-12}:1$ to $10^{-1}:1$, more preferably from $10^{-9}:1$ to $10^{-5}:1$.

Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar E™, available from Exxon Chemicals Inc.; cycloalkanes such as cyclopentane and cyclohexane; and aromatics such as benzene, toluene, xylenes, ethylbenzene and diethylbenzene.

The solvent is present in an amount sufficient to prevent phase separation in the reactor. As the solvent functions to absorb heat, less solvent leads to a less adiabatic reactor. The solvent:ethylene weight ratio is typically in the range from 2.5:1 to 12:1, beyond which point the catalyst efficiency suffers. The most typical solvent:ethylene weight ratio is in the range from 5:1 to 10:1.

Substantial linear and homogenous ultra-low molecular weight ethylene/α-olefin interpolymers useful in the invention may further be made in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

The polymerization may be carried out as a batchwise or a continuous polymerization process, with continuous polymerization processes being required for the preparation of SLEPs. In a continuous process, ethylene, copolymer and optionally solvent are continuously supplied to the reaction zone and polymer product is continuously removed therefrom.

The ultra-low molecular weight ethylene polymer may be prepared by the solution, slurry, or gas phase polymerization of ethylene and any desired comonomer(s), using a constrained geometry metal complex as the catalyst. The constrained geometry catalyst is described in more detail later.
Ethylene/Unsaturated Carboxylic Acid, Salt and Ester Interpolymers Ethylene/unsatuarated carboxylic acid salt and ester interpolymers may be used as component (A), (B) or (C) in this invention, particularly as component (B). These are interpolymers of ethylene with at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof. Terpolymers of ethylene and these comonomers are also suitable. Ionomers, which are completely or partially neutralized copolymers of ethylene and the acids described above, are discussed in more detail in U.S. Pat. No. 3,264,272, already incorporated herein by reference. In addition, terpolymers of ethylene/ vinyl acetate/carbon monoxide or ethylene/methyl acrylate/ carbon monoxide containing up to about 15% by weight of carbon monoxide can also be employed.

The ethylene to unsaturated carboxylic comonomer weight ratio is preferably from 95:5 to 40:60, more preferably from 90:10 to 45:50, and even more preferably from 85:15 to 60:40.

The melt index of these interpolymers may range from about 0.1 to about 150, preferably from about 0.3 to about 50, and more preferably from about 0.7 to about 10 dg/min. Physical properties, principally elongation, are known to decline to lower levels when the ethylene copolymer melt index is above about 30 dg/min.

Suitable ethylene/unsaturated carboxylic acid, salt and ester interpolymers include ethylene/vinyl acetate (EVA) including, but not limited to, the stabilized EVA described in U.S. Pat. No. 5,096,955, which is incorporated herein by reference; ethylene/acrylic acid (EEA) and its ionomers; ethylenelmethacrylic acid and its ionomers; ethylene/methyl acrylate; ethylene/ethyl acrylate; ethylene/isobutyl acrylate; ethylene/normal butyl acrylate; ethylene/isobutyl acrylate/ methacrylic acid and its ionomers; ethylene/normal butyl acrylate/methacrylic acid and its ionomers; ethylene/ isobutyl acrylate/acrylic acid and its ionomers; ethylene/ normal butyl acrylate/acrylic acid and its ionomers; ethylene/methyl methacrylate; ethylene/vinyl acetate/ methacrylic acid and its ionomers; ethylene/vinyl acetate/ acrylic acid and its ionomers; ethylene/vinyl acetate/carbon monoxide; ethylene/methacrylate/carbon monoxide; ethylene/normal butyl acrylate/carbon monoxide; ethylene/isobutyl acrylate/carbon monoxide; ethylene/vinyl acetate/monoethyl maleate and ethylene/methyl acrylate/monoethyl maleate. Particularly suitable copolymers are EVA; EEA; ethylene/methyl acrylate; ethylene/isobutyl acrylate; and ethylene/methyl methacrylate copolyers and mixtures thereof. Certain properties, such as tensile elongation, are taught to be improved by certain combinations of these ethylene interpolymers described in U.S. Pat. No. 4,379,190, which is incorporated herein by reference. The procedures for making these ethylene interpolymers are well known in the art and many are commercially available.

Constrained Geometry Catalysts

Constrained geometry metal complexes which are suitable for making substantially linear ethylene polymers and ultra-low molecular weight polymers, and methods for their preparation, are disclosed in U.S. application Ser. No. 545,403, filed Jul. 3, 1990 (EP-A-416,815); U.S. application Ser. No. 702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Ser. No. 720,041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts. For the teachings contained therein, the aforementioned pending United States patent applications, issued United States patents and published European patent applications are herein incorporated in their entirety by reference thereto.

Exemplary constrained geometry metal complexes in which titanium is present in the +4 oxidation state include but are not limited to the following: (η-butylamido)dimethyl($\eta^5$-tetramethylcyclopentadienyl)silanetitanium (IV) dimethyl; (η-butylamido)dimethyl($\eta^5$-tetramethylcyclopentadienyl)silanetitanium (IV) dibenzyl; (η-butylamido)dimethyl($\eta^5$-tetramethylcyclopentadienyl)silanetitanium (IV) dimethyl; (t-butylamido)dimethyl($\eta^5$-tetramethylcyclopentadienyl)silanetitanium (IV) dibenzyl; (cyclododecylamido)dimethyl($\eta^5$-tetramethylcyclopentadienyl)silanetitanium (IV) dibenzyl; (2,4,6-trimethylanilido)dimethyl($\eta^5$-tetramethylcyclopentadienyl)silanetitanium (IV) dibenzyl; (1-adamantylamido)dimethyl($\eta^5$-tetramethylcyclopentadienyl)-silanetitanium (IV) dibenzyl; (t-butylamido)dimethyl($\eta^5$-tetramethylcyclopentadienyl)-silanetitanium (IV) dimethyl; (t-butylamido)dimethyl($\eta^5$-tetramethylcyclopentadienyl)-silanetitanium (IV) dibenzyl; (1-adamantylamido)dimethyl($\eta^5$-tetramethylcyclopentadienyl)-silanetitanium (IV) dimethyl; (n-butylamido)diisopropoxy($\eta^5$tetramethylcyclopentadienyl)silanetitanium (IV) dimethyl; (n-butylamido)diisopropoxy($\eta^5$tetramethylcyclopentadienyl)silanetitanium (IV) dibenzyl; (cyclododecylamido)-diisopropoxy($\eta^5$-tetramethylcyclopentadienyl)-silanetitanium (IV) dimethyl; (cyclododecylamido)diisopropoxy($\eta^5$-tetramethylcyclopentadienyl)-silanetitanium (IV) dibenzyl; (2,4,6-trimethylanilido)diisopropoxy($\eta^5$-tetramethylcyclopentadienyl)silanetitanium (IV) dimethyl; (2,4,6-trimethylanilido)diisopropoxy($\eta^5$-tetramethylcyclopentadienyl)silanetitanium (IV) dibenzyl; (cyclododecylamido)dimethoxy($\eta^5$-tetramethylcyclopentadienyl)silanetitanium (IV) dimethyl; (cyclododecylamido)dimethoxy($\eta^5$-tetramethylcyclopentadienyl)silanetitanium (IV) dibenzyl; (1-adamantylamido)diisopropoxy($\eta^5$-tetramethylcyclopentadienyl)silanetitanium (IV) dimethyl; (1-adamantylamido)diisopropoxy($\eta^5$-tetramethylcyclopentadienyl)silanetitanium (IV) dibenzyl; (n-butylamido)dimethoxy($\eta^{15}$-tetramethylcyclopentadienyl)silanetitanium (IV) dimethyl; (n-butylamido)dimethoxy($\eta^5$-tetramethylcyclopentadienyl)silanetitanium (IV) dibenzyl; (2,4,6-trimethylanilido)dimethoxy($\eta^5$-tetramethylcyclopentadienyl)silanetitanium (IV) dimethyl; (2,4,6-trimethylanilido)dimethoxy($\eta^5$-tetramethylcyclopentadienyl)silane-titanium (IV) dibenzyl; (1-adamantylamido)-dimethoxy($\eta^5$-tetramethylcyclopentadienyl)silanetitanium (IV) dimethyl; (1-adamantylamido)dimethoxy($\eta^5$-tetramethylcyclopentadienyl)silanetitanium (IV) dimethyl; (n-butylamido)ethoxymethyl($\eta^5$-tetramethylcyclopentadienyl)silanetitanium (IV) dibenzyl; (cyclododecylamido)ethoxymethyl($\eta^5$-tetramethylcyclopentadienyl)-silanetitanium (IV) dimethyl; (cyclododecylamido)ethoxymethyl($\eta^5$-tetramethylcyclopentadienyl)silanetitanium (IV) dibenzyl; (2,4,6-trimethylanilido)ethoxymethyl-($\eta^5$-tetramethylcyclopentadienyl)silanetitanium (IV) dimethyl; (2,4,6trimethylanilido)ethoxymethyl($\eta^5$-tetramethylcyclopentadienyl)silanetitanium (IV) dibenzyl; (cyclododecylamido)dimethyl($\eta^5$-tetramethylcyclopentadienyl)silanetitanium (IV) dimethyl; (1-adamantylamido)ethoxymethyl($\eta^5$-tetramethylcyclopentadienyl)silanetitanium (IV) dimethyl; and (1-adamantylamido)ethoxymethyl($\eta^5$tetramethylcyclopentadienyl)silanetitanium (IV) dibenzyl.

Exemplary constrained geometry metal complexes in which titanium is present in the +3 oxidation state include but are not limited to the following: (n-butylamido)dimethyl ($\eta^5$-tetramethylcyclopentadienyl)silanetitanium (III) 2-(N,N-dimethylamino)benzyl; (t-butylamido)dimethyl($\eta^5$-tetramethylcyclopentadienyl)silanetitanium (III) 2-(N,N-dimethylamino)benzyl; (cyclododecylamido)dimethyl($\eta^5$-tetramethylcyclopentadienyl)silanetitanium (III) 2-(N,N-dimethylamino)benzyl; (2,4,6-trimethylanilido)dimethyl ($\eta^5$-tetramethylcyclopentadienyl)silanetitanium (III) 2-(N,N-dimethylamino)benzyl; (1-adamantylamido)dimethyl($\eta^5$-tetramethylcyclopentadienyl)silanetitanium (III) 2-(N,N-dimethylamino)benzyl; (t-butylamido)dimethyl($\eta^5$-tetramethylcyclopentadienyl)silanetitanium (III) 2-(N,N-dimethylamino)benzyl; (nbutylamido)diisopropoxy($\eta^5$-tetramethylcyclopentadienyl)silanetitanium (III) 2-(N,N-dimethylamino)benzyl; (cyclododecylamido)diisopropoxy ($\eta^5$-tetramethylcyclopentadienyl)silanetitanium (III) 2-(N,N-dimethylamino)benzyl; (2,4,6-trimethylanilido) diisopropoxy($\eta^5$-2-methylin-denyl)silanetitanium (III) 2-(N,N-dimethylamino)benzyl; (1-adamantylamido) diisopropoxy($\eta^5$-tetramethylcyclopentadienyl) silanetitanium (III) 2-(N,N-dimethylamino)benzyl; (n-butylamido)dimethoxy($\eta^5$-tetramethylcyclopentadienyl) silanetitanium (III) 2-(N,N-dimethylamino)benzyl; (cyclododecylamido)dimethoxy($\eta^5$-tetramethylcyclopentadienyl)silanetitanium (III) 2-(N,N-dimethylamino)benzyl; (1-adamantylamido)dimethoxy($\eta^5$-tetramethylcyclopentadienyl)silanetitanium (III) 2-(N,N-dimethylamino)benzyl; (2,4,6-trimethylanilido) dimethoxy ($\eta^5$-tetramethylcyclopentadienyl)silanetitanium (III) 2-(N,N-dimethylamino)benzyl; ($\eta^5$-butylamido)ethoxymethyl ($\eta^5$-tetramethylcyclopentadienyl)silanetitanium (III) 2-(N,N-dimethylamino)benzyl; (cyclododecylamido)

ethoxymethyl($\eta^5$-tetramethylcyclopentadienyl) silanetitanium (III) 2-(N,N-dimethylamino)benzyl; (2,4,6-trimethylanilido)ethoxymethyl($\eta^5$-tetramethylcyclopentadienyl)silanetitanium (III) 2(N,N-dimethylamino)benzyl; and (1-adamantylamido) ethoxymethyl($\eta^5$-tetramethylcyclopentadienyl) silanetitanium (III) 2-(N,N-dimethylamino)benzyl.

Exemplary constrained geometry metal complexes in which titanium is present in the +2 oxidation state include but are not limited to the following: (n-butylamido) dimethyl-($\eta^5$-tetramethylcyclopentadienyl)silanetitanium (II) 1,4-diphenyl-1,3-butadiene; (n-butylamido)dimethyl ($\eta^5$-tetramethylcyclopentadienyl)silanetitanium (II) 1,3-pentadiene; (t-butylamido)dimethyl($\eta^5$-tetramethylcyclopentadienyl)silanetitanium (II) 1,4-diphenyl-1,3-butadiene; (t-butylamido)dimethyl($\eta^5$-tetramethylcyclopentadienyl)silanetitanium (II) 1,3-pentadiene; (cyclododecylamido)dimethyl ($\eta^5$tetramethylcyclopentadienyl)silanetitanium (II) 1,4-diphenyl-1,3-butadiene; (cyclododecylamido)dimethyl($\eta^5$-tetramethylcyclopentadienyl)silanetitanium (II) 1,3-pentadiene; (2,4,6-trimethylanilido)dimethyl($\eta^5$-tetramethylcyclopentadienyl)silanetitanium (II) 1,4-diphenyl-1,3-butadiene; (2,4,6-trimethylanilido)dimethyl ($\eta^5$-tetramethylcyclopentadienyl)silanetitanium (II) 1,3-pentadiene; (2,4,6-trimethylanilido)dimethyl($\eta^5$-tetramethylcyclopentadienyl)silanetitanium (IV) dimethyl; (1-adamantylamido)dimethyl($\eta^5$-tetramethylcyclopentadienyl)silane-titanium (II) 1,4-diphenyl-1,3-butadiene; (1-adamantylamido)dimethyl($\eta^5$-tetramethylcyclopentadienyl)silanetitanium (II) 1,3-pentadiene; (t-butylamido)-dimethyl($\eta^5$-tetramethylcyclopentadienyl)silanetitanium tetramethylcyclopentadienyl) silanetitanium (II) 1,3-pentadiene; (nbutylamido)diisopropoxy($\eta^5$-tetramethylcyclopentadienyl)-silanetitanium (II) 1,4diphenyl-1,3-butadiene; (t-butylamido)dimethyl($\eta^5$-tetramethylcyclopentadienyl)silanetitanium (II) 1,3-pentadiene; (II) 1,3-pentadiene; (cyclododecylamido)-diisopropoxy($\eta^5$tetramethylcyclopentadienyl)silanetitanium (II) 1,4-diphenyl-1,3-butadiene; (cyclododecylamido) diisopropoxy($\eta^5$-tetramethylcyclopentadienyl)-silanetitanium (II) 1,3-pentadiene; (2,4,6-trimethylanilido) diisopropoxy($\eta^5$-2-methyl-indenyl)silanetitanium (II) 1,4-diphenyl-1,3-butadiene; (2,4,6-trimethylanilido)-diisopropoxy($\eta^5$-tetramethylcyclopentadienyl) silanetitanium (II) 1,3-pentadiene; (1-adamantylamido) diisopropoxy($\eta^5$-tetramethylcyclopentadienyl) silanetitanium (II) 1,4-diphenyl-1,3-butadiene; (1-adamantylamido)diisopropoxy($\eta^5$-tetramethyl-cyclopentadienyl)silanetitanium (II) 1,3-pentadiene; (n-butylamido)dimethoxy($\eta^5$-tetramethylcyclopentadienyl) silanetitanium (II) 1,4-diphenyl-1,3-butadiene; (n-butylamido)dimethoxy($\eta^5$-tetramethylcyclopentadienyl) silanetitanium (II) 1,3-pentadiene; (cyclododecylamido) dimethoxy($\eta^5$-tetramethylcyclopentadienyl )-silanetitanium (II) 1,4-diphenyl-1,3-butadiene; (cyclododecylamido) dimethoxy($\eta^5$-tetramethylcyclopentadienyl)silanetitanium (II) 1,3-pentadiene; (2,4,6-trimethylanilido)dimethoxy($\eta^5$-tetramethylcyclopentadienyl)silanetitanium (II) 1,4-diphenyl-1,3-butadiene; (2,4,6-trimethylanilido)dimethoxy ($\eta^5$-tetramethylcyclopentadienyl)silanetitanium (II) 1,3-pentadiene; (1-adamantyl-amido)dimethoxy($\eta^5$-tetramethylcyclopentadienyl)silanetitanium (II) 1,4-diphenyl-1,3-butadiene; (1-adamantylamido)dimethoxy($\eta^5$-tetramethylcyclopentadienyl)silanetitanium (II) 1,3-pentadiene; (n-butylamido)ethoxymethyl($\eta^5$-tetramethylcyclopentadienyl)silanetitanium (II) 1,4-diphenyl-1,3-butadiene; (n-butylamido)ethoxymethyl($\eta^5$-tetramethylcyclopentadienyl)silanetitanium (II) 1,3-pentadiene; (cyclododecylamido)ethoxymethyl($\eta^5$-tetramethylcyclopentadienyl)silanetitanium (II) 1,4-diphenyl-1,3-butadiene; (cyclododecylamido)ethoxymethyl ($\eta^5$-tetramethylcyclopentadienyl)silanetitanium (II) 1,3-pentadiene; (2,4,6-trimethylanilido)ethoxymethyl($\eta^5$-tetramethylcyclopentadienyl)silanetitanium (II) 1,4-diphenyl1,3-butadiene; (n-butylamido)ethoxymethyl($\eta^5$-tetramethylcyclopentadienyl)silanetitanium (II) 1,3-pentadiene; (1-adamantylamido)ethoxymethyl($\eta^5$-tetramethylcyclopentadienyl)silanetitanium (II) 1,4-diphenyl-1,3-butadiene; and (1-adamantylamido) ethoxymethyl($\eta^5$-tetramethylcyclopentadienyl) silanetitanium (II) 1,3-pentadiene.

The complexes can be prepared by use of well known synthetic techniques. The reactions are conducted in a suitable noninterfering solvent at a temperature from −100 to 300° C., preferably from −78 to 100° C., most preferably from 0 to 50° C. A reducing agent may be used to cause the metal M, to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718), EP-A-520,732 (equivalent to U.S. Ser. No. 07/876,268), and EP-A-520,732 (equivalent to U.S. Ser. Nos. 07/884,966 filed May 1, 1992), the teachings of which are hereby incorporated by reference.

Suitable activating cocatalysts for use herein include perfluorinated tri(aryl)boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium- salts of compatible, noncoordinating anions, and ferrocenium salts of compatible, noncoordinating anions. Suitable activating techniques include the use of bulk electrolysis. A combination of the foregoing activating cocatalysts and techniques may be employed as well.

Illustrative, but not limiting, examples of boron compounds which may be used as an activating cocatalyst in the preparation of the improved catalysts of this invention are tri-substituted ammonium salts such as trimethylammonium tetrakis(pentafluorophenyl) borate, triethylammonium tetrakis(pentafluorophenyl) borate, tripropylammonium tetrakis(pentafluorophenyl) borate,tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl) borate, N,N-dimethylanilinium tetrakis(4-(t-butyldimethylsilyl)-2,3,5,6-tetrafluorophenyl) borate, N,N-dimethylanilinium tetrakis(4-(triisopropylsilyl)-2,3,5,6-tetrafluorophenyl) borate, N,N-dimethylanilinium pentafluorophenoxytris (pentafluorophenyl) borate, N,N-diethylanilinium tetrakis (pentafluorophenyl)borate, N,N-dimethyl-2,4,6-trimethylanilinium tetrakis(pentafluorophenyl)borate, trimethylammonium tetrakis(2,3,4,6-tetrafluorophenyl) borate, triethylammonium tetrakis(2,3,4,6-tetrafluorophenyl) borate, tripropylammonium tetrakis(2,3,4,6-tetrafluorophenyl) borate, tri(n-butyl)ammonium tetrakis(2,3,4,6-tetrafluorophenyl) borate, dimethyl(t-butyl) ammonium tetrakis(2,3,4,6-tetrafluorophenyl)borate, N,N-dimethylanilinium tetrakis(2,3,4,6-tetrafluorophenyl) borate, N,N-diethylanilinium tetrakis(2,3,4,6-tetrafluorophenyl) borate, and N,N-dimethyl-2,4,6-trimethylanilinium tetrakis(2,3,4,6-tetrafluorophenyl) borate; disubstituted ammonium salts such as di-(i-propyl) ammonium tetrakis(pentafluorophenyl) borate, and dicyclohexylammonium tetrakis(pentafluorophenyl) borate; trisubstituted phosphonium salts such as triphenylphosphonium tetrakis(pentafluorophenyl) borate, tri(o-tolyl)phosphonium tetrakis(pentafluorophenyl) borate, and tri(2,6-dimethylphenyl)phosphonium tetrakis(pentafluorophenyl) borate; disubstituted oxonium salts such as diphenyloxonium tetrakis(pentafluorophenyl) borate, di(o-tolyl)oxonium tetrakis(pentafluorophenyl) borate, and di(2,6-dimethylphenyl)oxonium tetrakis(pentafluorophenyl) borate; disubstituted sulfonium salts such as diphenylsulfonium tetrakis(pentafluorophenyl) borate, di(o-tolyl) sulfonium tetrakis(pentafluorophenyl) borate, and bis(2,6-dimethylphenyl)sulfonium tetrakis(pentafluorophenyl) borate.

A most preferred activating cocatalyst is trispentafluorophenylborane.

Alumoxanes, especially methylalumoxane or triisobutylaluminum modified methylalumoxane are also suitable activators and may be used for activating these metal complexes.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:05:0.1, most typically from about 1:3:5.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of an dry, inert gas such as, for example, nitrogen.

The catalysts may be utilized in combination with at least one additional homogeneous or heterogeneous polymerization catalyst in separate reactors connected in series or in parallel to prepare the polymer blends according to the present invention. An example of such a process is disclosed in WO 94/00500, equivalent to U.S. Ser. No. 07/904,770, as well as U.S. Ser. No. 08/10958, filed Jan. 29, 1993, the teachings or which are hereby incorporated by reference herein.

These catalyst compositions may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material. The heterogeneous form of the catalyst system is employed in a slurry polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

Preferred Ranges

The polymer mixtures of the present invention will preferably have a crystallinity of at least 6%, more preferably at least 15%, preferably up to 50%, more preferably up to 30%, more preferably up to 21.5%, and even more preferably up to 18%.

For the inventive polymer mixture, the difference between the crystallinities of component (A) and component (B) is generally at least 7%, preferably at least 14%, more preferably at least 18%. The difference between the crystallinity of any one of components (A), (B), and (C) and the crystallinity of the component (A), (B), or (C) closest in crystallinity is preferably not greater than 60%, more preferably not greater than 50%, even more preferably not greater than 40%, even more preferably not greater than 30%.

In a preferred embodiment of this invention, the number average molecular weight of component (B), $M_{n2}$, is greater than or equal to the number average molecular weight of component (A), $M_{n1}$. In a particularly preferred embodiment, $M_{n2}$ exceeds $M_{n1}$ by 10% preferably by 20%, more preferably 50%. These blends generally have improved properties relative to polymer mixtures that do not fulfill this further requirement, such as higher softening point under load and lower compression set.

The weight ratio of component (A) to component (B) in the polymer mixture is preferably at least 30:70, more preferably greater than 60:40 and even more preferably at least 65:35, up to about 95:5, more preferably up to about 90:10. The combined weight of component (A) and component (B) in the polymer mixture is preferably at least 60 wt %, more preferably at least 75 wt %, even more preferably at least 90 wt % and even more preferably at least 95 wt %, either based on the combined weight of the polymers in the polymer mixture or in some instances based on the total weight of the polymer mixture (the "total weight" including other components such as nonpolymer adjuvants and diluents as opposed to the "combined weight" which here includes just the polymer components).

Component (C) may optionally be present in an amount greater than zero, preferably at least 5 wt %, more preferably at least 10 wt %, up to about 40 wt %, preferably up to about 25 wt %, either based on the total weight of the mixture of polymers (A), (B) and (C) or based on the total weight of the polymer mixture (the "total weight" including other components such as nonpolymer adjuvants and diluents as opposed to the "combined weight" which here includes just the polymer components).

Component (A) and component (B) preferably each independently have a MI in the range from 0.01, preferably from 0.05, up to 5000 dgl min. Component (C) preferably has a MI of at least about 0.05 up to 5000, more preferably up to 200, dg/min. The MI of component (A) is preferably greater than or equal to the MI of component (B), more preferably greater than that of component (B).

The MI of the polymer mixture of the invention is preferably at least 0.05, more preferably 0.5, preferably up to 100 dg/min.

Preferably, component (A) has a MWD ($M_w/M_n$) of at least 1.6, more preferably at least 1.8, up to about 3.2, more preferably up to about 2.7, and even more preferably up to about 2.2 and components (B) and (C) have MWDs greater than or equal to 1.6, more preferably at least 1.8, up to about 40, more preferably up to about 32. The MWD of the overall mixture is not greater than 3 when the overall crystallinity is greater than or equal to 21.5%.

The blends according to this invention usually, but not always, have at least two DSC melting peaks.

3. Methods of Making and Using

Another aspect of the present invention is a process for fabricating the polymer mixture of the invention into the form of a film, film layer, coating or molded article. The process can include a lamination and coextrusion technique or combinations thereof, or using the polymer mixture alone, and includes a blown film, cast film, extrusion coating, injection molding, blow molding, compression molding, rotomolding, or injection blow molding operation or combinations thereof.

The polymer mixture of the invention can be formed by any convenient method. Preparing the present compositions by physical admixture includes dry blending, melt blending and solution blending, i.e. dissolving one or both of the components in a suitable solvent, such as for example a hydrocarbon, and combining the components followed by removing the solvent or solvents. Dry blending involves blending the individual components in solid particulate and subsequently melt mixing in a mixer or by mixing the components together directly in a mixer (e.g., a Banbury mixer, a Haake mixer, a Brabender internal mixer, or a single or twin screw extruder including a compounding extruder and a side-arm extruder employed directly downstream of a interpolymerization process.

The mixtures of the invention can further be formed in-situ via the interpolymerization of ethylene and the desired α-olefin using a constrained geometry catalyst in at least one reactor and a constrained geometry catalyst or a Ziegler-type catalyst in at least one other reactor. The reactors can be operated sequentially or in parallel. An exemplary in-situ interpolymerization process is disclosed in PCT Patent Application 94/01052, incorporated herein by reference.

Preferably, the present compositions are prepared using two reactors operated in series or in parallel, or by in-reactor blending using two or more catalysts in a single reactor or combinations of multiple catalysts and multiple reactors. The general principle of making polymer blends by in-reactor blending using two or more catalysts in a single reactor or combinations of multiple catalysts and multiple reactors is described in WO 93/13143, EP-A-619827, and U.S. Pat. No. 3,914,362, each of which are incorporated herein by reference. The present polyolefin compositions can be prepared by selecting appropriate catalyst and process conditions with a view to the final composition characteristics.

The polymer mixture of the invention can further be formed by isolating component (A) from a heterogeneous ethylene polymer by fractionating the heterogeneous ethylene polymer into specific polymer fractions with each fraction having a narrow branching distribution, selecting the fractions appropriate to meet the limitations specified for component (A), and blending the selected fraction in the appropriate amounts with a component (B). This method is obviously not as economical as the in-situ polymerization described above, but can nonetheless be used to obtain the polymer mixture of the invention.

Additives, such as antioxidants (e.g., hindered phenolics, such as Irganox™ 1010 or Irganox™ 1076 supplied by Ciba Geigy and phosphates (e.g., Irgafos™ 168 also supplied by Ciba Geigy, Sandostab PEPQ™ supplied by Sandoz)), cling additives (e.g., PIB), tackifiers, plasticizers, oils, peroxides (such as for wire and cable coating applications), pigments, colorants, fillers, and the like may also be included in the polymer mixture of the present invention or in films formed from the same. Although generally not required, films, coatings and moldings formed from the polymer mixture of the present invention may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the antistatic characteristics of films, coatings and moldings formed from the polymer mixture of the invention and permit the use of these polymer mixtures in, for example, the heavy-duty packaging of electronically sensitive goods.

In a preferred embodiment, this invention relates to multi-component blends of the following material: (1) polyolefin elastomers, metallocene catalyst-based polymers, narrow comonomer composition and narrow molecular weight polymers, with (2) polyolefin plastomers, styrenic block copolymers, conventional LLDPE, HDPE, LDPE, and (3) petroleum-based oils (naphthenic and paraffinic oils). The finished products display lower hardness, yet have enhanced elevated temperature performance compared to a single resin plus oil composition at the same melt index and density of the polymer phase. The polymer blend plus oil can include fillers such as clay, calcium carbonate and talc, for example, to aid in lowering the cost of the composite and enhance the mechanical properties without loss of the observed advantages of the blends.

The polymer mixture of this invention may further include recycled and scrap materials and diluent polymers (both encompassed by the expression "diluent materials"), to the extent that the desired performance properties are maintained. Exemplary diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), EAA interpolymers, ethylene/vinyl acetate (EVA) interpolymers and ethylene/methacrylate (EMA) interpolymers, and combinations thereof. In some instances, it is preferable for the polymer mixture of this invention to contain less than 50 wt %, more preferably less than 30 wt % and even more preferably less than 10 wt %, diluent material, particularly when the diluent material is a styrene copolymer, more particularly when the diluent material is a styrene/butadiene rubber and even more particularly when the diluent material is a styrene/butadiene/styrene block copolymer (SBS).

Processes for making a molded article by injection molding comprise: (A) heating a polymer mixture according to this invention to a temperature suitable for injection molding; (B) injecting the polymer mixture of step (A) into a mold to form the molded article; (C) cooling the polymer mixture of step (B); and (D) removing from the mold the molded article formed in steps (B) and (C). This process may optionally include (E) crosslinking the polymer mixture.

Many ethylene polymers, including the preferred SLEPs, require significant cooling periods before they can be removed from the mold into which they were injected at an elevated temperature. This causes a delay between injection into the mold and removal of the molded article from the mold for each injection. This results in prolonged cycle times between injections, which translates to lower productivity for a given investment in injection molding equipment. There is thus a strong desire in the polymer industry to reduce this delay in cycle time. An important and unexpected advantage of this invention is that it reduces cooling time, and hence decreases cycle time, for a given crystallinity and melt index.

In a preferred embodiment of this aspect of the invention, the cooling time, and hence the cycle time, is less, preferably 20 percent less, more preferably 50 percent less, than the cooling time measured the same way under the same conditions (i.e., same equipment, same starting and ending temperatures, same degree of cooling after injection, etc.) for a single ethylene polymer made of the same monomers as component (A), but having the same crystallinity and melt index as the polymer mixture in question. The cooling time of the polymer mixture may also be less, preferably 20 percent less, more preferably 50 percent less, than the cooling time predicted by the rule of mixtures, yielding a corresponding improvement in cycle time.

The polymer mixtures of this invention can be shaped into a final shape and then crosslinked with known crosslinking agents to form vulcanized elastomeric products. The expression "vulcanized elastomeric products" as used herein means products having a crosslinking density of at least 5% gel as measured via ASTM D2765, Procedure A, which is incorporated herein by reference. Crosslinking agents include peroxide, sulfur, epoxy and other known heat-activated curing agents and electron beam, gamma-ray and other known radiation-activated cure systems. If the crosslinking agent is a heat-activated substance, e.g. a peroxide, sulfur, etc., then this agent is included in the polymer mixture of the present invention prior to the heating step (A) of the process of this invention. If the crosslinking agent is a radiation source, e.g. electron beam, then obviously the agent is not present until after forming the molded article according to step (B) of this invention. Sulfur as a crosslinking agent is used only with those olefinic polymers capable of being crosslinked with sulfur, e.g. those containing diene functionality, such as ethylene/propylene/diene terpolymer (EPDM). The various crosslinking agents can be used alone or in combination with one another. One embodiment in which more than one curing agent may be used is that in which a peroxide is included in the polymer mixture of step (A) as the free radical initiator to effect the grafting of the crosslinker to the ethylene polymer. In this embodiment, excess or residual peroxide from the grafting may be available for initiating crosslinking along with another crosslinking agent, e.g. an epoxy, electron beam, etc.

Suitable heat-activated crosslinking agents include free radical initiators, preferably organic peroxides, more preferably those with one hour half lives at temperatures greater than 120° C. Examples of useful organic peroxides include 1,1-di-t-butyl peroxy-3,3,5-trimethylcyclohexane, dicumyl peroxide, 2,5-dimethyl-2,5-di(t-butyl peroxy) hexane, t-butyl-cumyl peroxide, di-t-butyl peroxide, and 2,5-dimethyl-2,5-di-(t-butyl peroxy) hexyne. Dicumyl peroxide is a preferred agent. Additional teachings regarding organic peroxide crosslinking agents are available in the *Handbook of Polymer Foams and Technology*, pp. 198–204, Edited by D. Klempner and K. C. Frisch, Hanser Publishers, Munich, Vienna, New York, Barcelona (1991), which is incorporated herein by reference.

Free radical crosslinking coagents, i.e. promotors or co-initiators, include multifunctional vinyl monomers and polymers, triallyl cyanurate and trimethylolpropane trimethacrylate, divinyl benzene, acrylates and methacrylates of polyols, allyl alcohol derivatives, and low molecular weight polybutadiene.

4. Formed Article Properties and Uses

At temperatures above room temperature, the articles made from the polymer mixtures according to the present invention exhibit improved properties both relative to a single ethylene polymer of equal crystallinity and substantially the same melt index (±20%), and improvements greater than would be expected for the polymer mixtures under the rule of mixtures. Improved properties include higher softening point under load and improved hardness, toughness, 100% modulus of elasticity, and compression set, particularly at temperatures greater than room temperature (i.e., 25° C.) such as temperatures in excess of 50 or 60° C.

These improved properties are achieved without requiring crosslinking of these polymer mixtures. Although these polymer mixtures may be crosslinked, they have utility and certain advantages without crosslinking. Advantages of the non-crosslinked products include ease of processing, flexibility in manufacturing methods, and recyclability of the polymer.

However, further improvements in these properties may be obtained through crosslinking the polymer mixtures of this invention beyond the gel point. As used herein, "crosslinking" and "crosslinked" include partially crosslinking (crosslinked) as well as fully crosslinking (crosslinked), as long as the crosslinking results in a gel which is verifiable via ASTM D2765, Procedure A. In some preferred embodiments, these polymer mixtures have a crosslinking density of at least 20%, more preferably at least 50% and even more preferably at least 80%, as measured via ASTM D2765, Procedure A.

Figure 2:
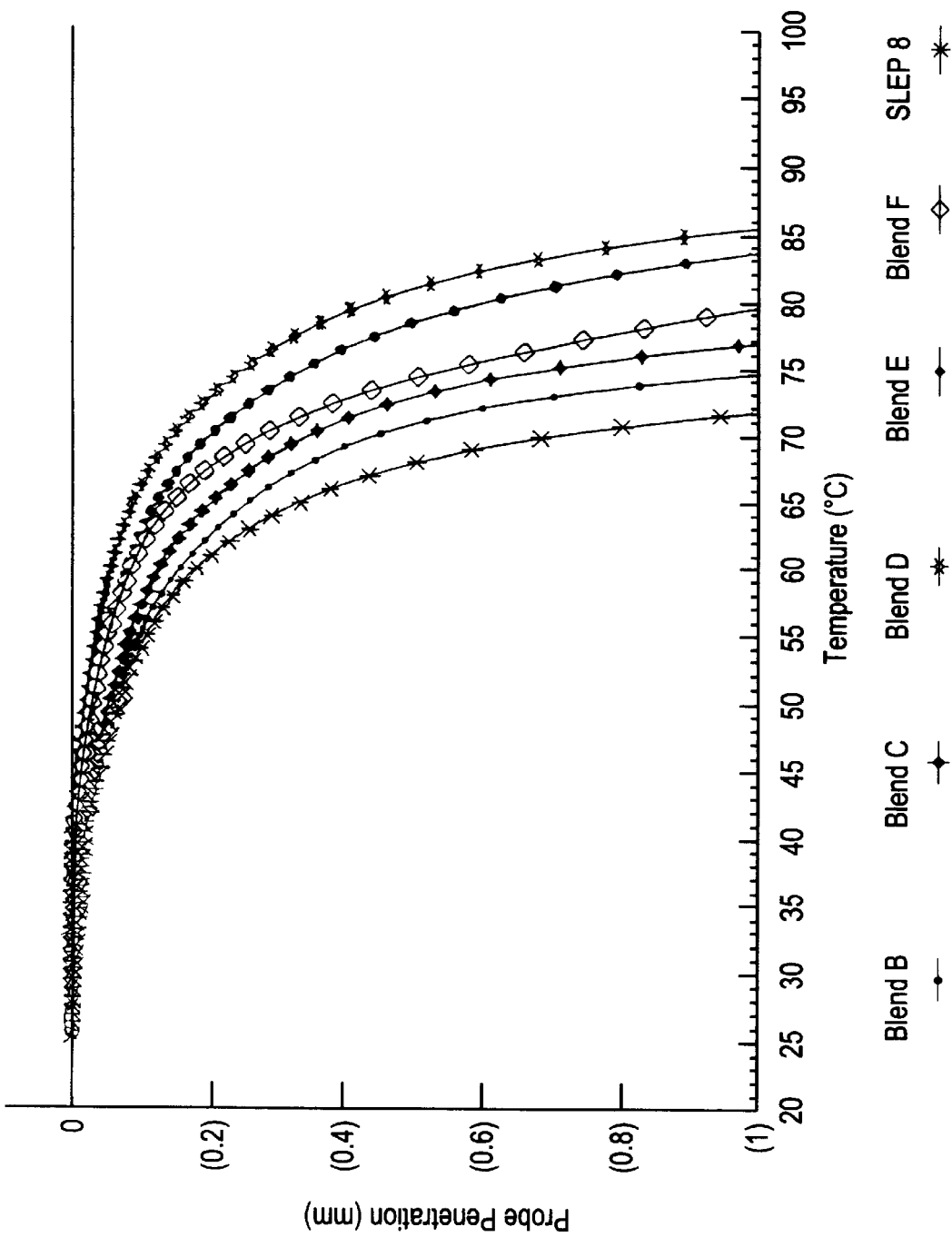
FIG. 2 shows probe penetration versus temperature plots obtained with the procedure described above for FIG. 1 for five two-component blends of substantially linear ethylene 1-octene copolymers according to the present invention (blends B–F), each having the same blend crystallinity (17.8%), in which the difference in crystallinity between the components is varied from 7.5% to 36%, and a single substantially linear ethylene 1-octene copolymer having the same crystallinity.
Figure 3:
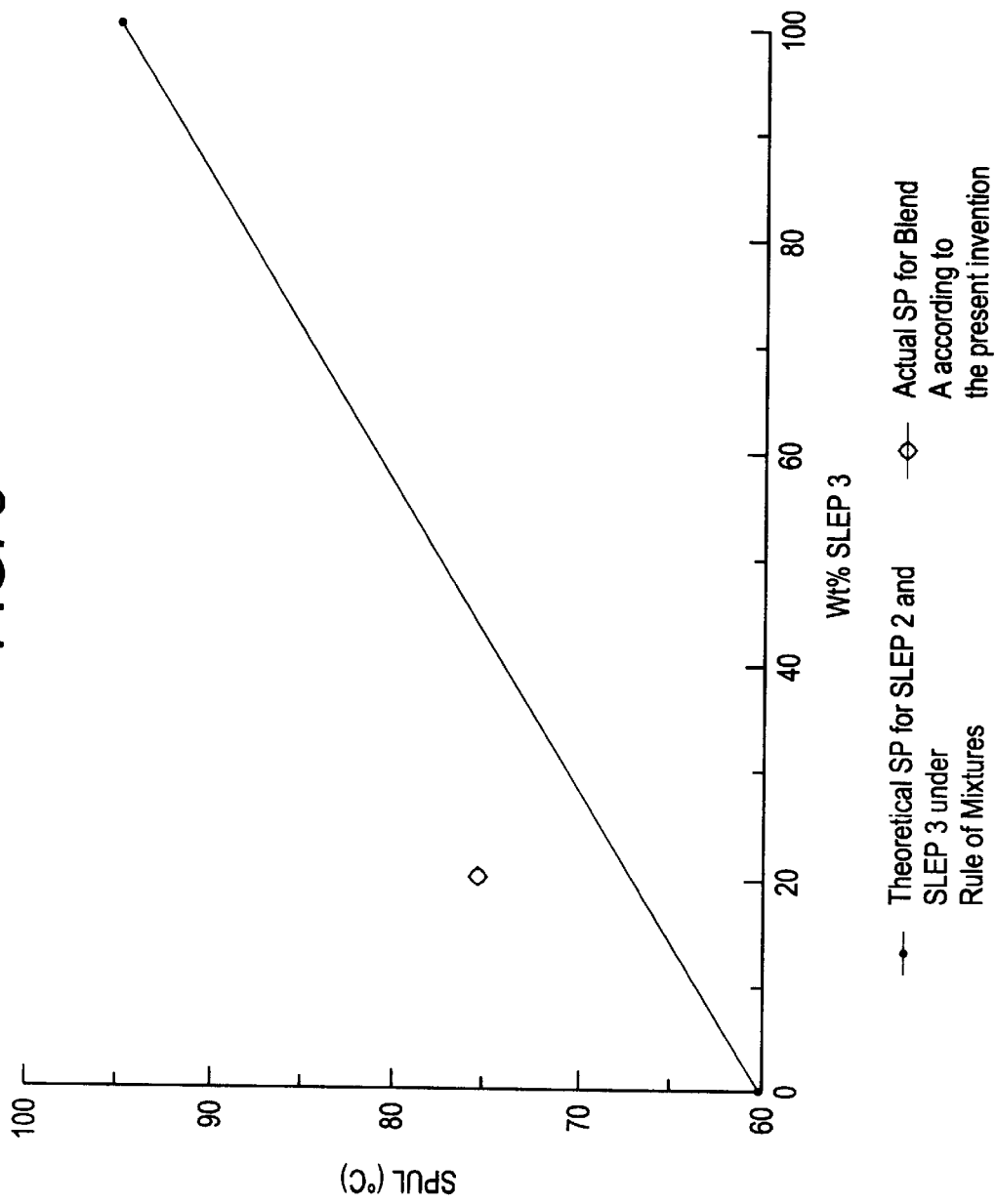
FIG. 3 shows the softening point under load (SPUL) of SLEP 2, SLEP 3 and blend A as defined in FIG. 1. The softening point means the temperature at which a TMA probe having a constant force of 1 N penetrates 1 mm into the polymer sample using the procedure for determining probe penetration versus temperature of FIG. 1.

The preferred polymer mixtures according to the present invention have a softening point under load (defined above) greater than that which would be predicted based on the softening point under load, of a similar polymer of the same crystallinity and substantially the same MI (±20%) or, more preferably, greater than the softening point under load predicted by the rule of mixtures based on the softening point under load of the individual polymer components of the mixture weight averaged together based on the relative wt % amounts of each of those components in the mixture. Blends A through F according to this invention are shown to fulfill the first of these preferred embodiments in FIGS. 1 and 2 and blend A is also shown to fulfill the second of these preferred embodiments as shown in FIG. 3.

Preferably, the polymer mixtures according to the present invention have a softening temperature under load (1 N applied with a flat tip probe having a diameter of 1 mm) of at least 3° C., more preferably 5° C., even more preferably at least 10° C., greater than the softening point predicted by the rule of mixtures. In one preferred embodiment, the polymer mixtures according to this invention have a softening point under load of at least 75° C., more preferably at least 80° C. FIG. 2 shows a polymer mixture according to the present invention having a softening point under load more than 10° C. greater than the softening point predicted by the rule of mixtures.

Figure 4:
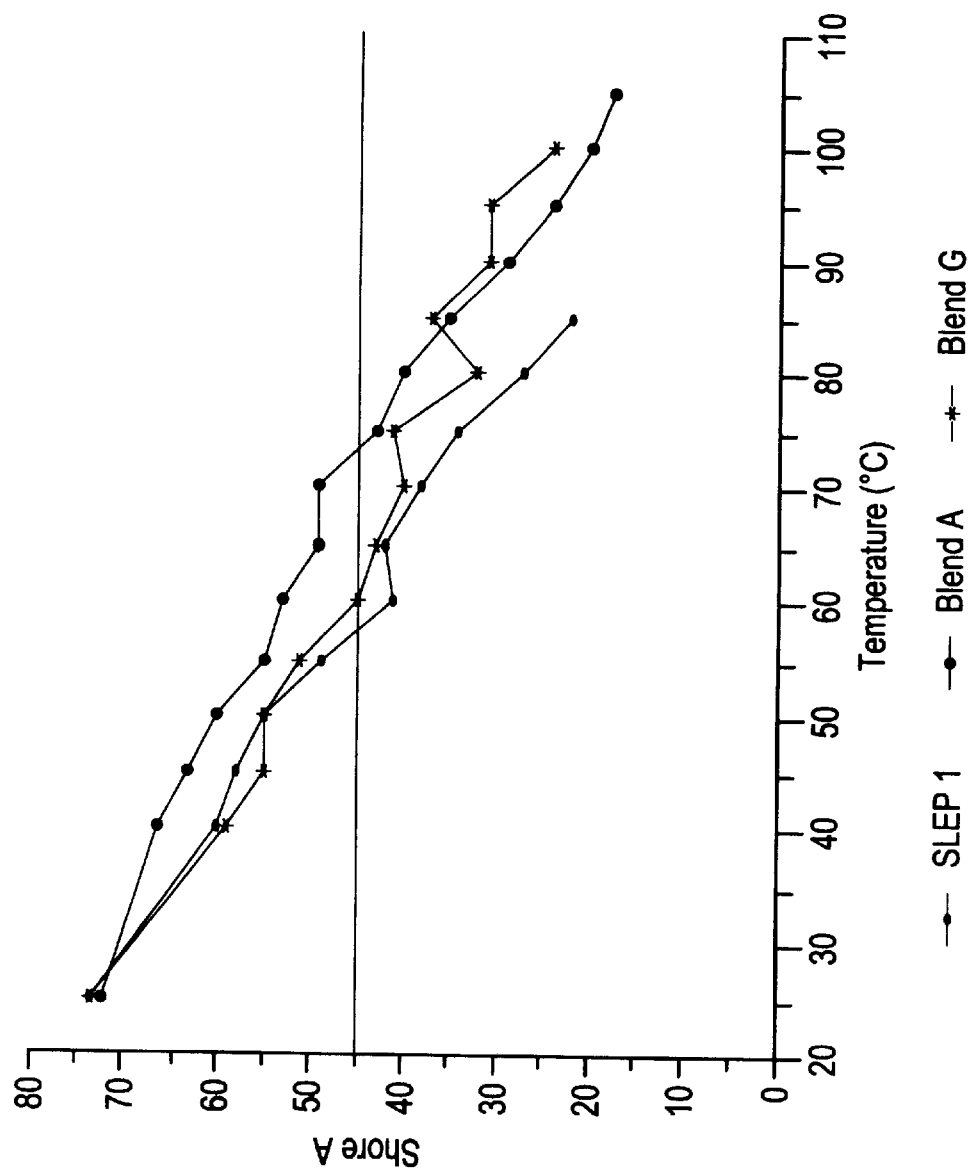
FIG. 4 shows Shore A hardness vs. temperature data for single polymer SLEP 1 (defined above) and polymer blends A and G according to the present invention, each having the same crystallinity. Blend A is defined above and blend G is a blend of SLEP 2 (defined above) and a linear low density ethylene polymer (LLDPE1).
Figure 5:
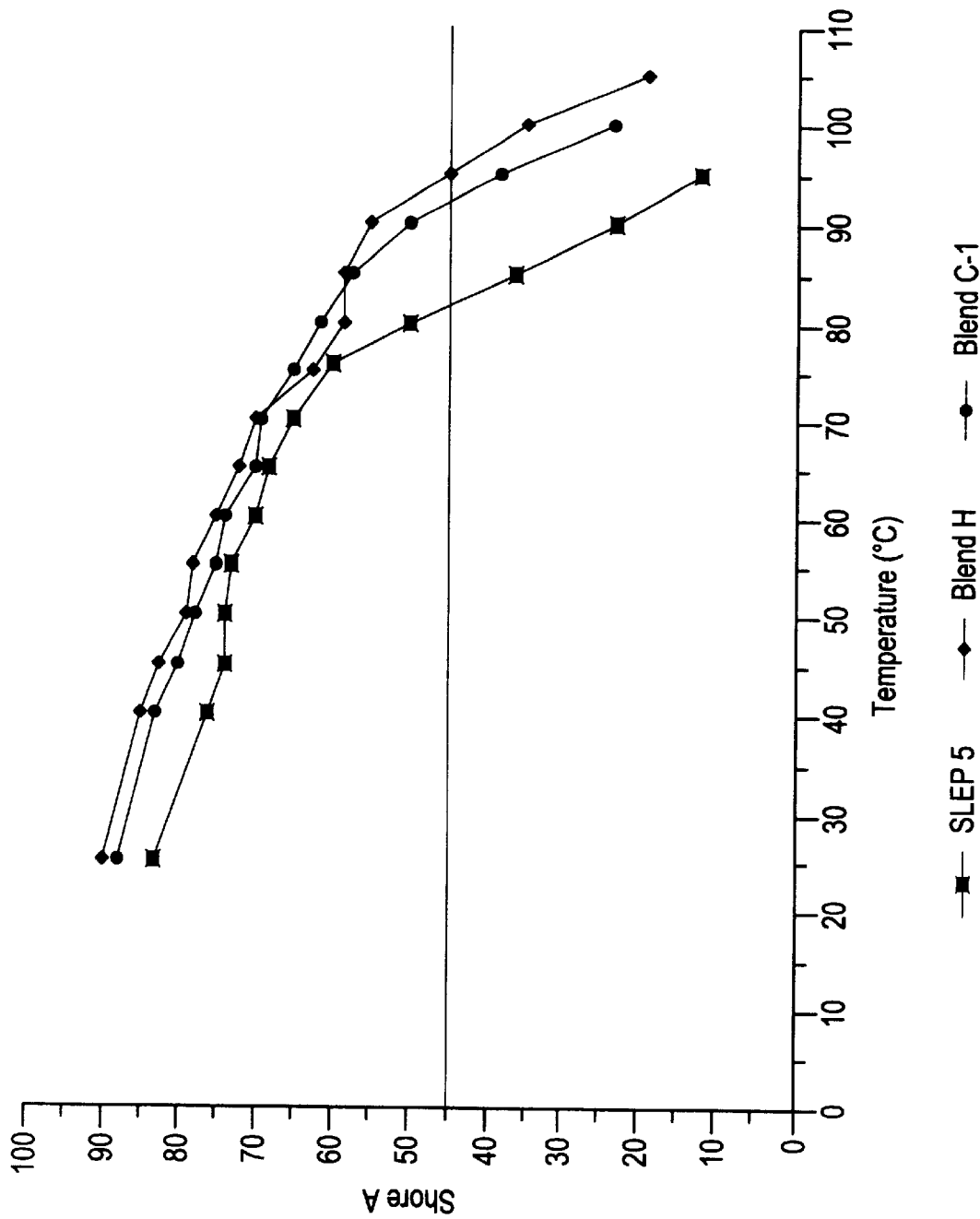
FIG. 5 shows Shore A hardness vs. temperature plots for a substantially linear ethylene 1-octene copolymer (SLEP 7), blend H according to the present invention, and comparative blend C-1. Blend H is a 50:50 blend of a low crystallinity substantially linear ethylene 1-octene copolymer (SLEP 9) and a higher crystallinity (38.2%) substantially linear ethylene 1-octene copolymer (SLEP 6) in which the number average molecular weight ($M_n$) of SLEP 6 is greater than that of SLEP 9. Blend C-1 is a 50:50 blend of low crystallinity (SLEP 1) and higher crystallinity (SLEP 10) substantially linear ethylene 1-octene copolymers, each having the same crystallinity as the corresponding components of blend H, but the $M_n$s of the lower and higher crystallinity components are reversed so that the $M_n$ of the lower crystallinity component is higher than the $M_n$ of the higher crystallinity component. Blend C-1 is for illustration only and is not to be taken as an admission of prior art.

One measure of improved elevated temprature hardness is an increase in temperature for a given Shore A hardness. Preferred polymer mixtures according to the present invention have a Shore A hardness of 45 at a temperature higher than the temperature of a similar polymer of the same crystallinity at a Shore A hardness of 45, and preferably higher than the temperature predicted based on the rule of mixtures. More preferably, the polymer mixtures according to the present invention have a temperature at Shore A hardness of 45 at least 3° C., preferably at least 5° C., even more preferably at least 10° C., greater than the temperature at Shore A hardness of 45 for a similar polymer having the same crystallinity or the temperature predicted by the rule of mixtures. The former is illustrated by FIGS. 4 and 5, which show that blends A, G and H according to the present invention exhibit a Shore A hardness of 45 at a temperature higher than that of a polymer of the same density.

The 100% modulus (stress at 100% elongation) is also improved with mixtures according to the present invention, particularly at elevated temperatures. This improvement may also be measured relative to a similar polymer of the same crystallinity or preferably relative to the 100% modulus predicted by the rule of mixtures. When the 100% modulus for the polymer mixture produced according to the present invention is measured at 60° C., a measurable improvement is obtained. The improvement is preferably at least by a factor of 1.5, more preferably at least a factor of 2, even more preferably at least by a factor of 4, relative to a similar polymer having the same crystallinity, preferably relative to the 100% modulus predicted under the rule of mixtures.

In a preferred embodiment, the 100% modulus of elasticity at 60° C. is at least 120 psi, more preferably at least 140 psi.

At 60° C., toughness is also improved, preferably by the same factors and amounts as for 100% modulus.

Compression set (ASTM D395-85, which is incorporated herein by reference) is also improved at elevated temperatures. At 70° C., compression set is improved by preferably at least 5%, more preferably by at least 10%, relative to a similar polymer having the same crystallinity, preferably relative to the compression set predicted by the rule of mixtures.

Figure 6:
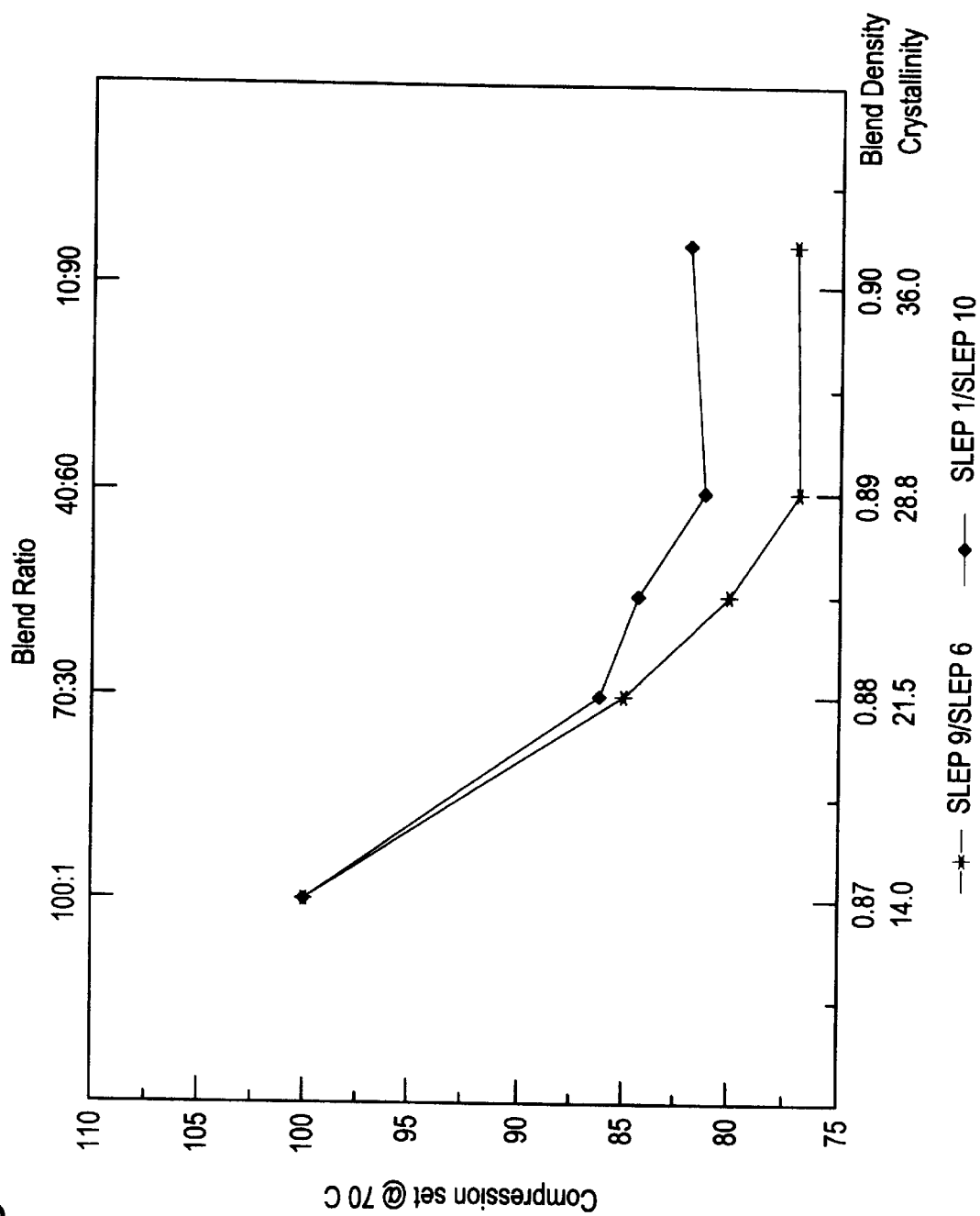
FIG. 6 shows compression set at 70° C. relative to blend ratio and blend density for two pairs of low and high crystallinity polymer components at five blend ratios. One pair, SLEP 9/SLEP 6, is a combination of a low crystallinity, low Mn substantially linear ethylene 1-octene copolymer with a higher crystallinity, higher Mn ethylene 1-octene copolymer and the other pair, SLEP 1/SLEP 10, is a combination of lower and higher crystallinity substantially linear ethylene 1-octene copolymers in which, as stated above for FIG. 5, the $M_n$s of the lower and higher crystallinity components are reversed from those of SLEP 9/SLEP 6, so that the $M_n$ of the lower crystallinity component is higher than the $M_n$ of the higher crystallinity component.

In a preferred embodiment, the polymer mixtures of this invention have a compression set less than 90% more preferably less than 80%, at 70° C. Further improvement may be obtained by selecting component (A) having a lower $M_n$ than the $M_n$ of component (B). This is illustrated by FIG. 6, which shows that a blend of a low crystallinity substantially linear ethylene 1-octene copolymer (SLEP 9) with a higher crystallinity substantially linear ethylene 1-octene copolymer (SLEP 6) having a lower melt index (i.e., higher $M_n$) has a lower compression set than a blend of substantially linear ethylene 1-octene copolymers in which the $M_n$ relationship in the blend is reversed (SLEP 1/SLEP 10).

Many useful fabricated articles benefit from the polymer mixtures disclosed herein. The polymer mixture of this invention may find utility in a variety of applications including, but not limited to adhesives, molded goods, profile extrusion parts, foams, fibers, films, sporting goods such as swimming fins, etc., elastic bands and elastic fibers such as for making disposable diapers, etc., shoe soles such as foamed shoe soles, latex footwear, weather strips, gaskets, etc. For example, molding operations can be used to form useful fabricated articles or parts from the compositions disclosed herein, including various injection molding processes (e.g., that described in *Modern Plastics Encyclopedia*/89, Mid October 1988 Issue, Volume 65, Number 11, pp. 264–268, "Introduction to Injection Molding: by H. Randall Parker and on pp. 270–271, "Injection Molding Thermoplastics" by Michael W. Green) and blow molding processes (e.g., that described in *Modern Plastics Encylcopedia*/89, Mid October 1988 Issue, Volume 65, Number 11, pp. 217–218, "Extrusion-Blow Molding" by Christopher Irwin), profile extrusion, calandaring, and pultrusion (e.g., pipes). Rotomolded articles can also benefit from the novel compositions described herein. Rotomolding techniques are well know to those skilled in the art and include, for example, those described in *Modern Plastics Encyclopedia*/89, Mid October 1988 Issue, Volume 65, Number 11, pp. 296–301, "Rotational Molding" by R. L. Fair.

Fibers (e.g., staple fibers, melt blown fibers or spunbonded fibers) using, e.g., systems as disclosed in U.S. Pat. No. 4,340,563, U.S. Pat. No. 4,663,220, U.S. Pat. No. 4,668,566, or U.S. Pat. No. 4,322,027, and gel spun fibers (e.g., the system disclosed in U.S. Pat. No. 4,413,110), both woven and nonwoven fabrics (e.g., spunlaced fabrics disclosed in U.S. Pat. No. 3,485,706) or structures made from such fibers (including, e.g., blends of these fibers with other fibers, e.g., PET or cotton)) can also be made from the novel compositions disclosed herein.

Film and film structures particularly benefit from the novel compositions described herein and can be made using conventional hot blown film fabrication techniques or other biaxial orientation processes such as tenter frames or double bubble processes. Conventional hot blown film processes are described, for example, in The *Encyclopedia of Chemical Technology*, Kirk-Othmer, Third Edition, John Wiley & Sons, New York, 1981, vol. 16, pp. 416–417 and Vol. 18, pp. 191–192. Biaxial orientation film manufacturing process such as described in a "double bubble" process as in U.S. Pat. No. 3,456,044 (Pahike), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compostions described herein. The film structures can also be made as described in a tenter-frame technique, such as that used for oriented polypropylene.

Other multi-layer film manufacturing techniques for food packaging applications are described in *Packaging Foods With Plastics*, by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by the TAPPI Press (1992)).

The films may be monolayer or multilayer films. The film made from the novel compostions can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, Jun. 15–17 (1981), pp. 211–229. If a monolayer film is produced via tubular film (i.e., blown film techniques) or flat die (i.e., cast film) as described by K. R. Osborn and W. A. Jenkins in "Plastic Films, Tehcnology and Packaging Applications" (Technomic Publishing Co., Inc. (1992), the disclosure of which is incoproated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositons comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compostions described herein comprise at least one layer of the total multilayer film structure. Other layers of the multilayer structure include but are not limited to barrier layers, an/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephhalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generall, the multilayer film structures comprise from 2 to 7 layers.

The following examples are illustrative of certain specific embodiments of this invention.

EXAMPLES

Materials

The polymers in Table I below were made via solution process using the appropriate catalyst. Table I describes the properties of the various polymers used. Table II describes the compositions and densities of blends A–H and the comparative blend. The data on these blends is presented in FIGS. 1–6.

TABLE I

| Polymer Characterization | | | |
|---|---|---|---|
| Polymer Designation | Polymer Type* | Melt Index (g/10 min.) | Crystallinity (%) |
| SLEP 1 | Homog./POE | 1.0 | 14.0 |
| SLEP 2 | Homog./POE | 0.5 | 8.6 |
| SLEP 3 | Homog./POP | 1.6 | 32.5 |
| SLEP 4 | Homog./POE | 1.0 | 21.5 |
| SLEP 5 | Homog./POE | 1.0 | 25.2 |
| SLEP 6 | Homog./POP | 1.0 | 38.2 |
| SLEP 7 | Homog./POP | 1.0 | 49.9 |
| SLEP 8 | Homog./POE | 3.0 | 17.8 |
| SLEP 9 | Homog./POE | 30 | 14.0 |
| SLEP 10 | Homog./POP | 30 | 38.2 |
| LLDPE1 | Heterogen. PE | — | 35.3 |

*POE means polyolefin elastomer, POP means polyolefin plastomer. All are ethylene 1-octene copolymers.

TABLE II

| | Blend Composition | | | | | | | | |
|---|---|---|---|---|---|---|---|---|---|
| | Wt % of Components in Blend | | | | | | | | |
| Component | A | B | C | D | E | F | G | H | C-1 |
| SLEP 1 | | 50 | 67 | 78 | 83 | 90 | | | 50 |
| SLEP 2 | 80 | | | | | | 82 | | |
| SLEP 3 | 20 | | | 22 | | | | | |
| SLEP 4 | | 50 | | | | | | | |
| SLEP 5 | | | 33 | | | | | | |
| SLEP 6 | | | | | 17 | | | 50 | |
| SLEP 7 | | | | | | 10 | | | |
| SLEP 8 | | | | | | | | | |
| SLEP 9 | | | | | | | | 50 | |
| SLEP 10 | | | | | | | | | 50 |
| LLDPE 1 | | | | | | | 18 | | |
| Blend Crystallinity | 14.0 | 17.8 | 17.8 | 17.8 | 17.8 | 17.8 | 17.8 | 25.2 | 25.2 |

Equipment and Procedures

The polymer blends were prepared in a Haake Torque Rheometer using a mixing bowl having total capacity of either 40 grams or 200 grams. The mixing was carried out at 190° C. at 60 rpm for about 6 minutes.

Softening point under load determinations were made using a ThermoMechanical Analyzer made by Perkin-Elmer, model TMA-7, with a flat probe diameter of 1.0 mm was used. The samples were melt pressed at 190° C. for 3 minutes and then air-cooled to room temperature. The samples had thicknesses of about 3 mm. A small circle of about 8 mm diameter was cut and placed onto the sample holder in the TMA. The samples were heated at a rate of 5° C./min from 25° C. onwards under a constant probe force of 1 N. Probe penetration as a function of temperature was measured. The temperature at the probe penetration of 1 mm was taken as the softening point under load of the materials.

SLEP/SLEP and SLEP/LLDPE blends exhibited higher softening point under load and lower compression set at 70° C. compared to single component SLEP resin at equivalent density.

FIG. 1 shows that an SLEP 2/SLEP 3 blend according to the present invention exhibits a higher softening point under load than a single SLEP having the same density, SLEP 1 (o,●). The disparity in resistance to probe penetration is even greater at one-tenth constant probe force as shown by the 1cN plots.

FIG. 2 shows that resistance to probe penetration is improved at elevated temperature relative to a single polymer of the same density (SLEP 8) over a wide range of component (A) to component (B) weight ratios and density differences. In this illustration, the optimum crystallinity difference is 18.5% gel illustrated by blend D according to this invention.

FIG. 3 shows that the softening point under load of the SLEP 2/SLEP 3 blend according to the present invention ( ) is higher than the softening point under load under the rule of mixtures represented by the straight line correlation from the softening point of SLEP 2 (60° C. at 0 wt % SLEP 3) to the softening point of SLEP 3 (95° C. at 100wt % SLEP 3).

The Shore A hardness versus temperature method is an extension of the ASTM 2240 Shore A method at room temperature. The following procedure was used to obtain Shore A hardness versus temperature data: A blend obtained using the above mixing procedure was melt pressed at 190° C. and held at 190° C. for 3 minutes. The sample was removed and immediately placed between two platens cooled using water at room temperature. The samples had thickness of about 125 mm. A sample piece of about 2"×1.5" (5 cm×3.8 cm) was obtained from the plaque and the room temperature hardness was measured. The same sample piece was then placed on a metal plate in a forced air oven. The hardness of the samples was obtained at higher temperatures in 5° C. increments from 40° C. onwards. The temperature at Shore A hardness of 45 approximated the softening point under load of these samples. Each Shore A hardness measurement is based on the maximum Shore A hardness shown on a hand held durometer when the durometer is first pressed against the sample.

FIG. 4 shows that blends (A) and (G) according to the present invention exhibit a Shore A hardness of 45 at a higher temperature than the single polymer of the same density, SLEP 1. It also shows that blend (A), which is a blend of two homopolymers, exhibits a Shore A hardness of 45 at a higher temperature than blend (G), which is a blend of a homogeneous polymer with a heterogeneous polymer (LLDPE1).

FIG. 5 shows that blend (H) according to the present invention exhibited a Shore A hardness of 45 at a temperature about 10° C. higher than SLEP 1 having the same density and at a temperature about 3° C. higher than comparative blend C-1 in which the $M_n$ are reversed for the high and low density polymers in a 50:50 blend.

Compression set testing was carried out according to ASTM D395-85. The sample to be tested was molded into plaques of 120 and 60 mm thickness and then punched out into disks having the required thickness (0.49±0.02 inch (1.2±0.05 cm)) and diameter (1.14±0.01 inch (2.90±0.02 cm)). The disks were stacked and the original thickness, $t_o$, was measured. The stack was then placed on mylar in a compression device having a ⅜ inch (1 cm) ($t_n$) spacer bar and subjected to compression for 22 hours at 70° C. by placing the device in a circulating air oven. The samples were then removed from the compression device and allowed to cool for 30 minutes. The final thickness, $t_i$, was then measured.

Compression set was calculated based on the equation:

$$C_B=[(t_o-t_i)/(t_o-t_n)]\times 100$$

in which $C_B$ equals compression set expressed as percentage of the original deflection.

FIG. 6 shows compression set at 70° C. data for five ratios of low density polymer to high density polymer for two pairs of polymer components. The combination of the low density, low $M_n$ polymer with the higher density, higher $M_n$ (SLEP 9/SLEP 6) has a lower compression set at 70° C. at all blend ratios than the combination in which the $M_n$ was greater for the low density polymer. Lower compression set means better elastic recovery.

Blends which consist of the listed polymer components having the same or different melt indices (molecular weights) and a density of at least 0.01 g/cc are prepared to determine if higher loading of processing/extender oil could be incorporated in the mixture without blooming (oil loss over time). The blend plus oil composites are compared to pure polymer plus oil composites having the same final melt index and density of the polymer phase.

The blend composites are prepared in a small scale internal mixer (Haake System 90) and can be made via any internal or continuous process that allows addition of multiple ingredients such as Banbury™ type mixers, single or twin screw extruders, etc. The blends can also be prepared via multiple reactor configurations.

The elevated temperature performance of the blends can be enhanced by incorporating copolymers made with higher alpha-olefins (such as octene) compared to copolymer blends that contain propylene as a comonomer. The specific example below shows that blends of polymers with oil have higher tensile strengths at ambient temperature (23° C.) and at elevated temperature (60° C.) compared to blends of propylene and octene copolymers and having same final melt index, density and oil content.

The applications for the softer polymers include extrusion and injection articles, FDA-compliant packaging, wire and cable insulation, automotive application and footwear.

Example A

A polyolefin elastomer, EG8100 having a melt index of 1.0 g/10 min and a density of 0.87 g/cc is blended with a polyolefin plastomer, AFFINITY™ PL1880, having a melt index of 1.0 g/10 min and a density of 0.902 g/cc in a 53:47 ratio to give an overall melt index of 1.0 g/10 min and a density of 0.885 g/cc. The BLEND (labelled in FIG. 7) is compared to a pure ENGAGE™ EG8003 (labelled PURE in FIG. 7) having a melt index of 1.0 g/10 min and a density of 0.885 g/cc.

The oil used is a United States Pharmacopoein (USP) white mineral oil, Duoprime™ 200, supplied by Lyondell Petrochemical.

The compound is mixed on a Haake Torque Rheometer System 90 with a Rheomix 3000 mixing head and roller type blades. The temperature is controlled at 100° C. The polymer is added to the mixer and run at 30 RPM for 5 minutes. The speed is increased to 50 RPM to add the oil. The oil is added slowly to avoid losing torque during mixing. After all the oil is added, the mixer speed is reduced to 30 RPM and mixed for 5 minutes.

After removing the compound from the mixer, a portion of the sample is compression molded into a 125 mil (0.32)

plaque at 100° C. using 133 kN force on a 7.6 cm×17.8 cm (3 inch×7 inch) sample. The sample is pressed for 1 minute with no pressure to preheat the sample, then for 2 minutes at the specified force. The samples are cooled at the same force in the cooling section of the press at 23° C. for 2 minutes.

Oil blooming is determined by cutting the compression molded samples into 2 each, 1.5 inch×3-inch (3.8 cm×8 cm) plaques and weighing the cigarette paper (to the nearest 0.0001 g) before placing the paper between the plaques. The paper used is Bugler Premium No. 1 size, imported by Brown and Williamson Tobacco Corp., Louisville, Ky. 40232.

The paper is very thin, so any excess oil that exudes to the surface will be absorbed by the paper and a weight change will be observed. The plaque and paper "sandwich" is allowed to equilibrate for 24 hours at standard lab conditions (72° F. and 50% relative humidity).

Figure 7:
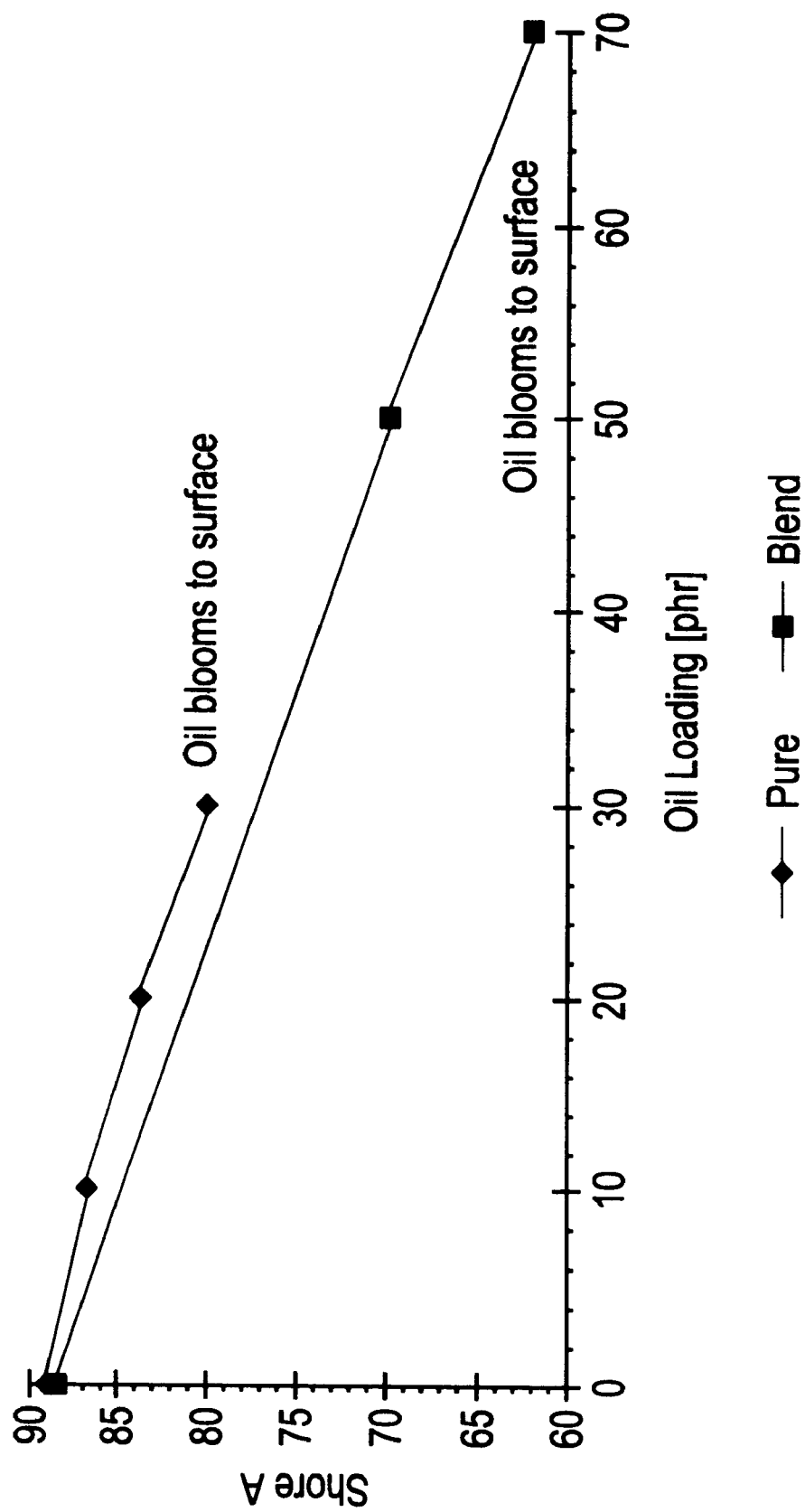
FIG. 7 illustrates the improvement in oil loading and effect on Shore A hardness for the BLEND (labelled in FIG. 7) compared to pure Dow ENGAGE™ EG8003 (labelled PURE in FIG. 7) having a melt index of 1.0 g/10 min. and a density of 0.885 g/cc. The BLEND consisted of a polyolefin elastomer, EG8100 having a melt index of 1.0 g/10 min. and a density of 0.87 g/cc, blended with a polyolefin plastomer, AFFINITY™ PL1880 having a melt index of 1.0 g/10 min. and a density of 0.902 g/cc, in a 53:47 ratio to give an overall melt index of 1.0 g/10 min. and a density of 0.885 g/cc.

The paper is weighed after the first 24 hours to determine if the paper has absorbed any oil. An increase in the weight of the cigarette paper by 2% or greater constitutes a loss of oil by bleeding. FIG. 7 illustrates the improvement in oil loading and effect on Shore A hardness.

Example B

Figure 8:
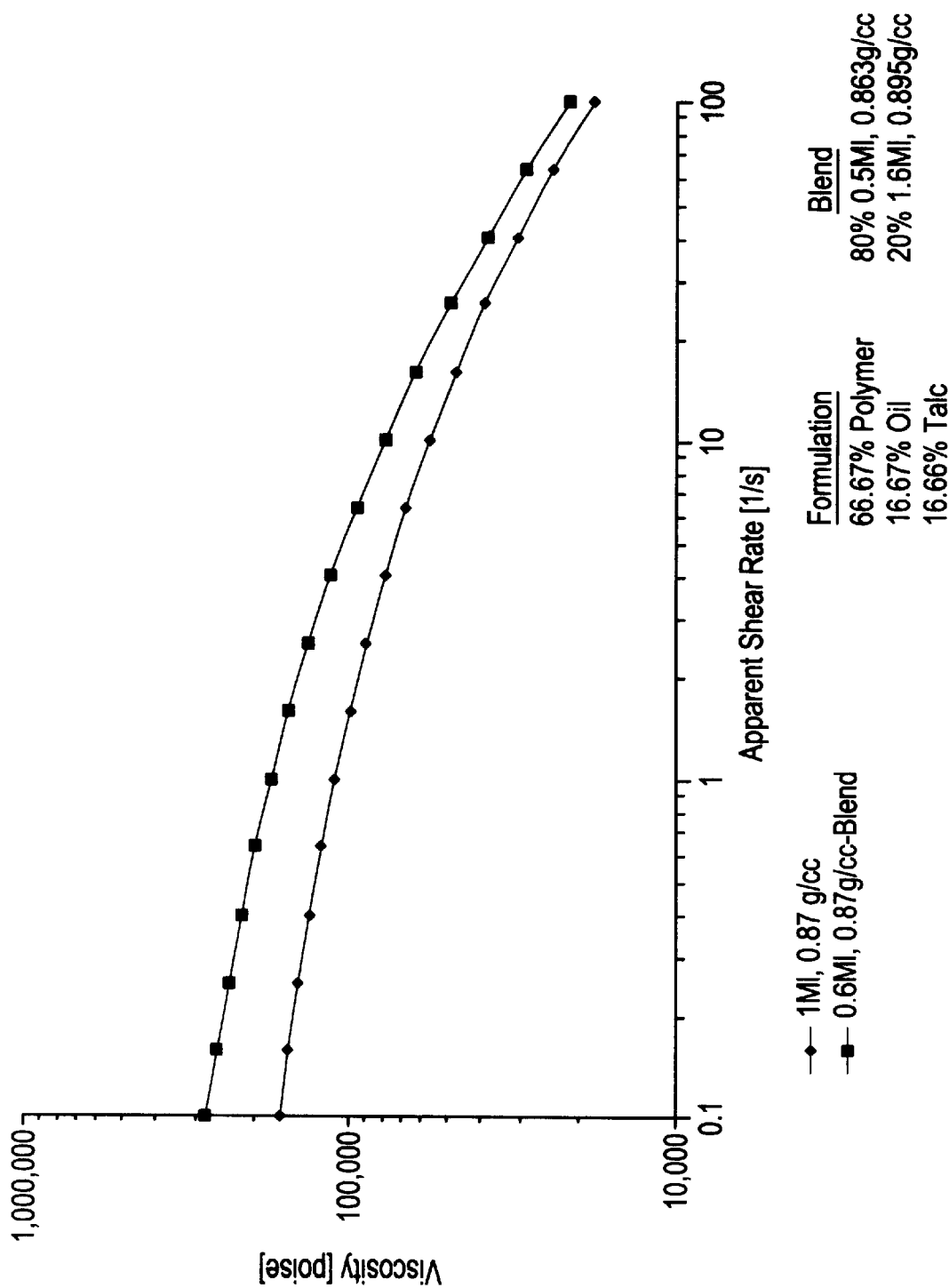
FIG. 8 shows apparent viscosity at 130° C. for single resin and binary blend, both containing talc and oil. Formulation contained 66.67% polymer, 16.67% oil and 16.66% talc. The single resin polymer had a melt index of 1.0 g/10 min. and a density of 0.87 g/cc. The oil used was a United States Pharmacopoein (USP) white mineral oil, Duoprime™ 200, supplied by Lyondell Petrochemical. The binary blend polymer (labelled BLEND in FIG. 8) contained 80% DEG 8180, having a melt index of 0.5 g/10 min and a density of 0.863 g/cc, and 20% PF 1140, having a melt index of 1.6 g/10 min. and a density of 0.895 g/cc, to give an overall melt index of 0.6 g/10 min. and density of 0.87 g/cc.

This example relates to filled systems which include polymer blend, oil and talc. The compounds are prepared in a Banbury™ "BR" internal mixer. The capacity of the mixer was 1573 cm$^3$ and the loading remained constant at 75% full including all ingredients. Table III lists the formulations of the compounds tested.

were run at 130° C. over a frequency of 0.1 to 100 Hertz. The frequency is equivalent to the apparent shear rate by using the Cox-Mertz rule. FIG. 8 shows that the Blend compound has a higher viscosity due to the lower 12 of the blend (Calculated Blend $I_2$=0.6 g/10 min compared to an $I_2$=1 g/10 min in the single resin compound).

Figure 9:
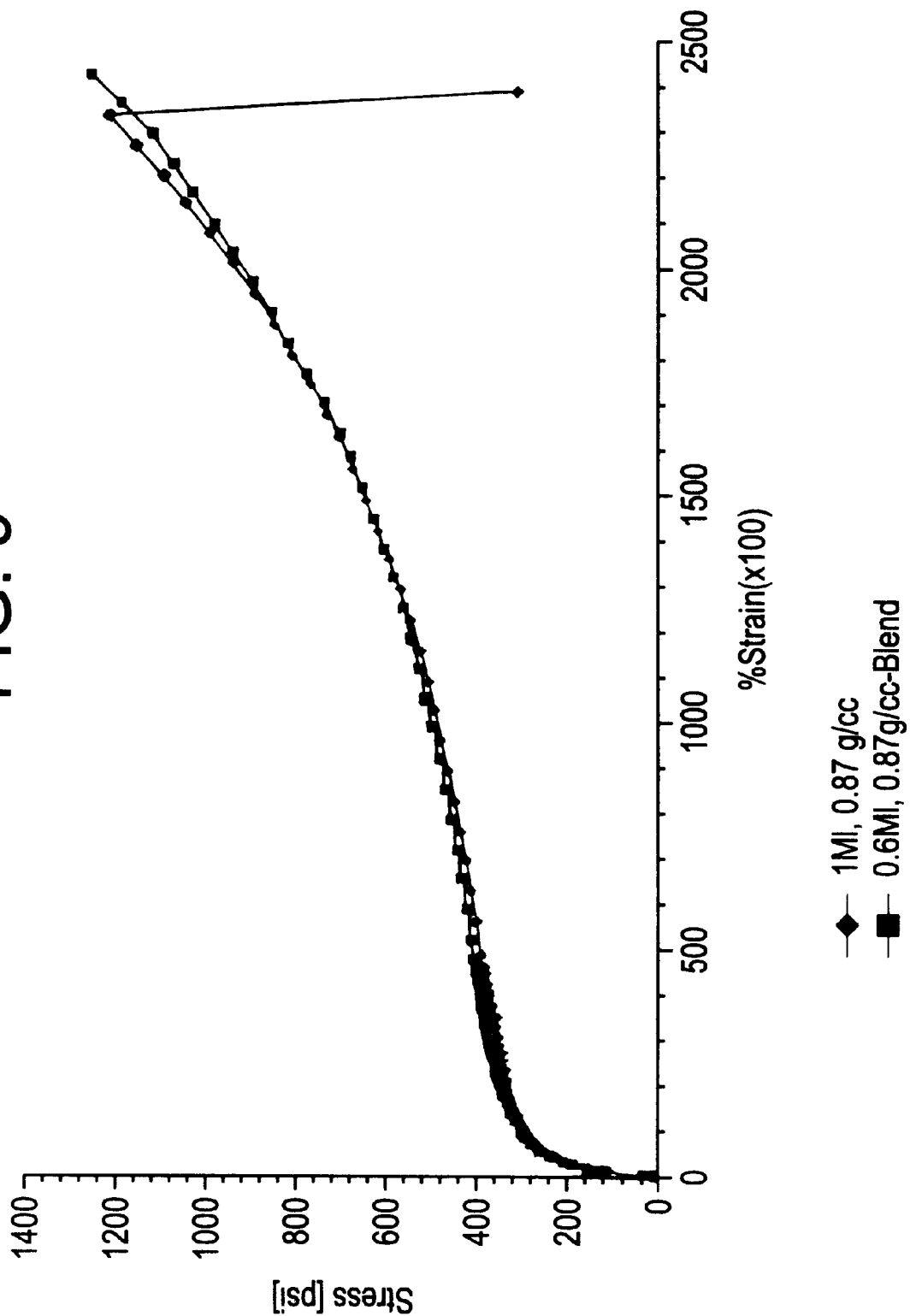
FIG. 9 shows stress-strain behavior of the single resin and binary blend, both containing talc and oil. The formulations are as described for FIG. 8.
Figure 10:
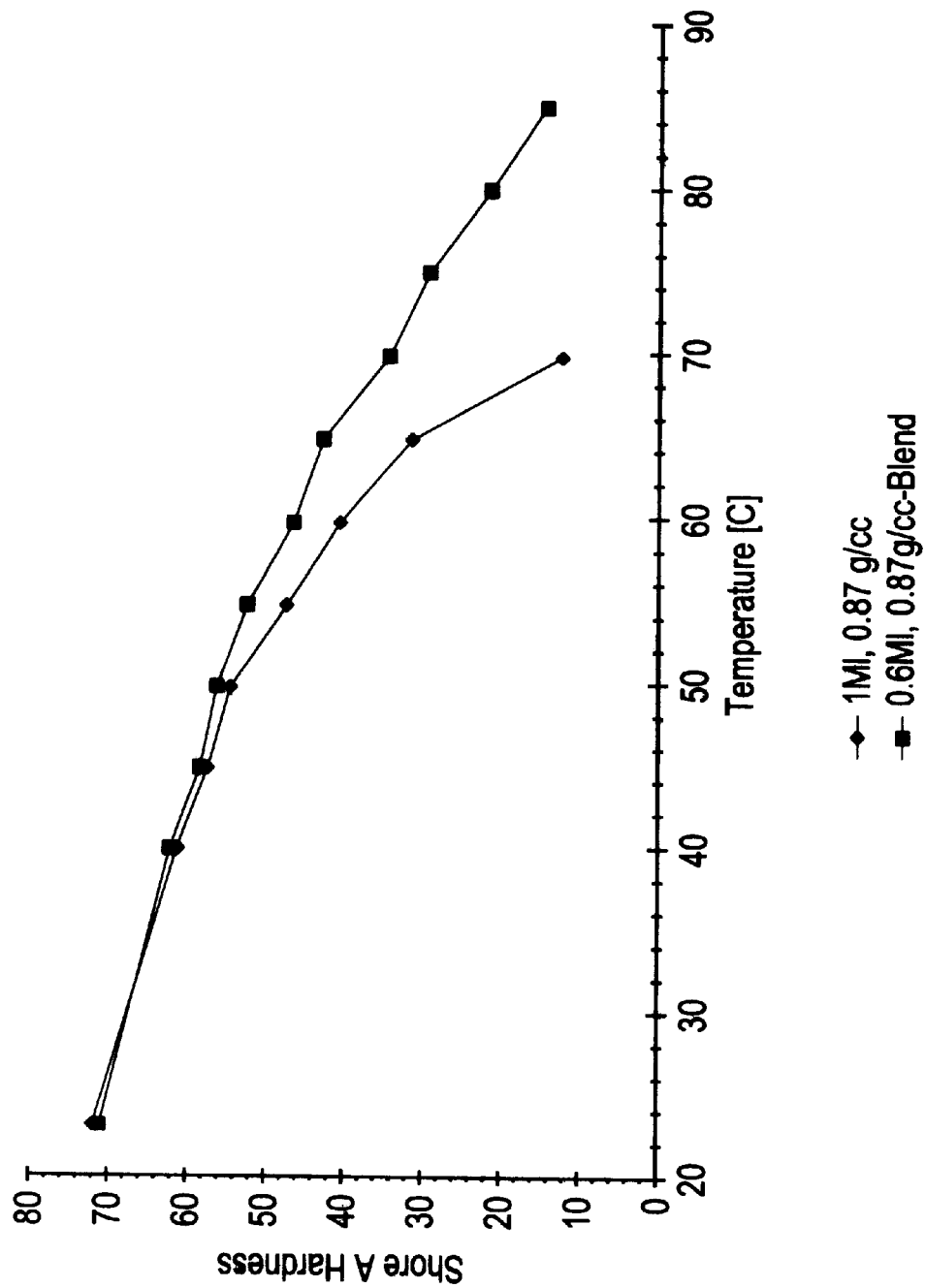
FIG. 10 shows Shore A versus temperature for a single resin and binary blend, both containing talc and oil. The formulations are as described for FIG. 8.

The ambient temperature stress-strain behavior of the single resin system compared to the blend is shown in FIG. 9, The compounds were measured using an Instron Model 1123 universal tester. The rate was 2 inches (5 cm) per minute and the sample geometry was similar to ASTM D-1708 with a shorter (0.25 inch (0.63 cm)) guage length FIG. 10 shows the effect of blending on the Shore A hardness of the compound as a function of temperature. The blended compound retains its hardness at higher temperatures compared to the single resin system. This is an example of the improved under load softening temperature (ULST) in a polymer blend with oil including filler for cost savings.

Figure 11:
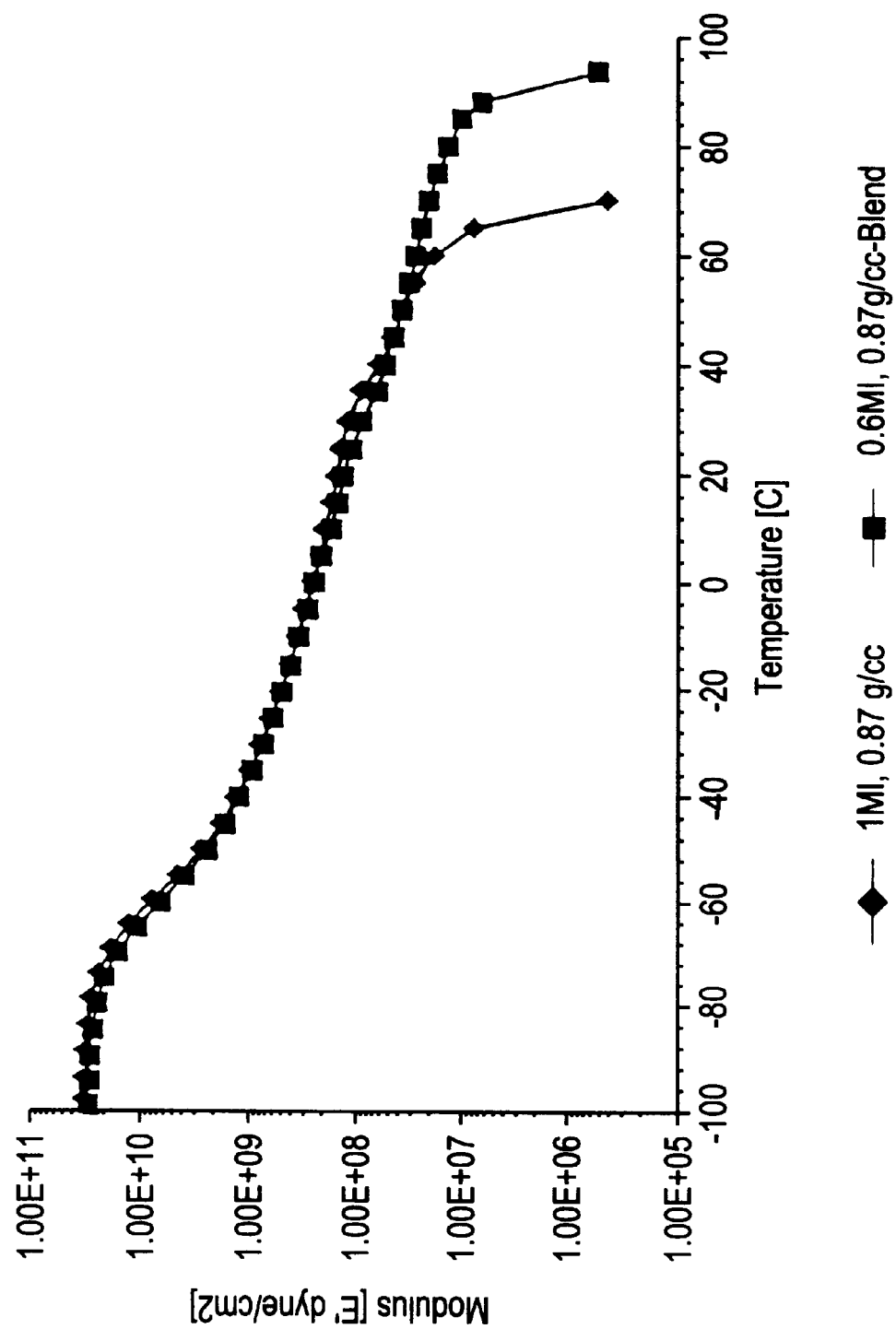
FIG. 11 shows the dynamic modulus versus temperature of a single resin and binary blend, both containing talc and oil. The formulations are as described for FIG. 8.

The dynamic modulus as a function of temperature is shown in FIG. 11. The blend shows an increase in the temperature at which the modulus drops off significantly.

The data in Table IV below shows the level of oil that can be incorporated in the blend depends on the melt index of the polymer components (Polymer A and Polymer B) in the blend. Sample 51319-26-3 showes oil bloom while the same melt index and calculated overall density blend (51319-30-6) with the same level of Shellflex™ 371 oil does not show

TABLE III

| Banbury | Material | PhR | SP.GR | Volume | Vol % | Grams | Wt % | | |
|---|---|---|---|---|---|---|---|---|---|
| 51319-32-7 | Resin | 100 | 0.87 | 114.94 | 74.9% | 768.34 | 66.7% | S.Gr | 0.98 |
| 1M, 0.87 g/cc | Oil | 25 | 0.852 | 29.34 | 19.1% | 192.09 | 16.7% | Wt*[g] | 1152.52 |
| | Talc | 25 | 2.7 | 9.26 | 6.0% | 192.09 | 16.7% | Load Factor | 7.08 |
| | | 150 | | 153.54 | | | | Chamber= 75 % Full | 75% |
| 51319-32-7 | PF1140 | 20 | 0.895 | 22.35 | 14.6% | 163.24 | 13.3% | S.Gr | 0.97 |
| 0.6M, 0.87 g/cc | DEG8180 | 80 | 0.86 | 93.02 | 60.4% | 612.97 | 53.3% | Wt*[g] | 1149.32 |
| | Oil | 25 | 0.852 | 29.34 | 19.1% | 191.55 | 16.7% | Load Factor | 7.66 |
| Blend | Talc | 25 | 27 | 9.26 | 0.0% | 191.55 | 16.7% | | |
| | | 150 | | 163.7 | | | | Chamber = 75% Full | 75% |

The rheological characterization was made in a Rheometric Dynamic Mechanical Spectrometer RMS-800. The tests oil bloom. This effect is not noticed until higher level of oil (70 phr or greater) is added to the blends.

TABLE IV

| | | Effect Of Oil Loading And Molecular Weight Of The Blend Components | | | | | | | |
|---|---|---|---|---|---|---|---|---|---|
| | | 51319-26-1 | 51319-23-1 | 51319-23-2 | 51319-26-2 | 51319-23-3 | 51319-26-3 | 51319-26-5 | 51319-30-6 |
| Polymer A | 1MI, 0.885 | 1MI, 0.87 | 1MI, 0.885 | 1MI, 0.87 | 1MI, 0.87 | 30MI, 0.87 | 30MI, 0.87 | 1MI, 0.87 | 1MI, 0.87 |
| Polymer B | — | 1MI, 0.902 | — | 1MI, 0.902 | 1MI, 0.902 | 1MI, 0.902 | 1MI, 0.902 | 30MI, 0.902 | 30MI, 0.902 |
| Composite | 1MI, 0.885 | 1MI, 0.885 | 1MI, 0.885 | 1MI, 0.885 | 1MI, 0.885 | 6MI, 0.885 | 6MI, 0.885 | 5MU, 0.885 | 5MI, 0.885 |
| Oil Phr | 0 | 0 | 50 | 50 | 70 | 50 | 70 | 50 | 70 |

TABLE IV-continued

Effect Of Oil Loading And Molecular Weight Of The Blend Components

| | 51319-26-1 | 51319-23-1 | 51319-23-2 | 51319-26-2 | 51319-23-3 | 51319-26-3 | 51319-26-5 | 51319-30-6 |
|---|---|---|---|---|---|---|---|---|
| Mixing TRQ | 2500 | 2494 | 490 | 790 | 584 | 310 | 95 | 270 | 226 |
| Temp | 115 | 100 | 110 | 106 | 103 | 100 | 102 | 105 | 99 |
| Oil Bleed | None | None | Excessive | None | Moderate | None | Moderate | None | None |
| Tensile | 4278.3 | 3844 | — | 2039 | 1552 | 869 | 635 | 1338 | 998 |
| Elong | 1985.5 | 1720 | — | 2921 | 2884 | 2230 | 2113 | 2830 | 2871 |
| 100 | 616 | 628 | — | 311 | 239 | 164 | 214 | 266 | 214 |
| 200 | 719 | 712 | — | 384 | 290 | 186 | 255 | 320 | 241 |
| 300 | 790 | 798 | — | 412 | 319 | 197 | 271 | 343 | 262 |
| Tough | 38733 | 30636 | — | 29807 | 22422 | 7240 | 8704 | 20600 | 15883 |
| Hardness | 87 | 88.3 | — | 69.9 | 62.1 | 65.6 | 56.9 | 66.11 | 58.5 |

Measured with the automatic test stand durometer type A

Figure 12:
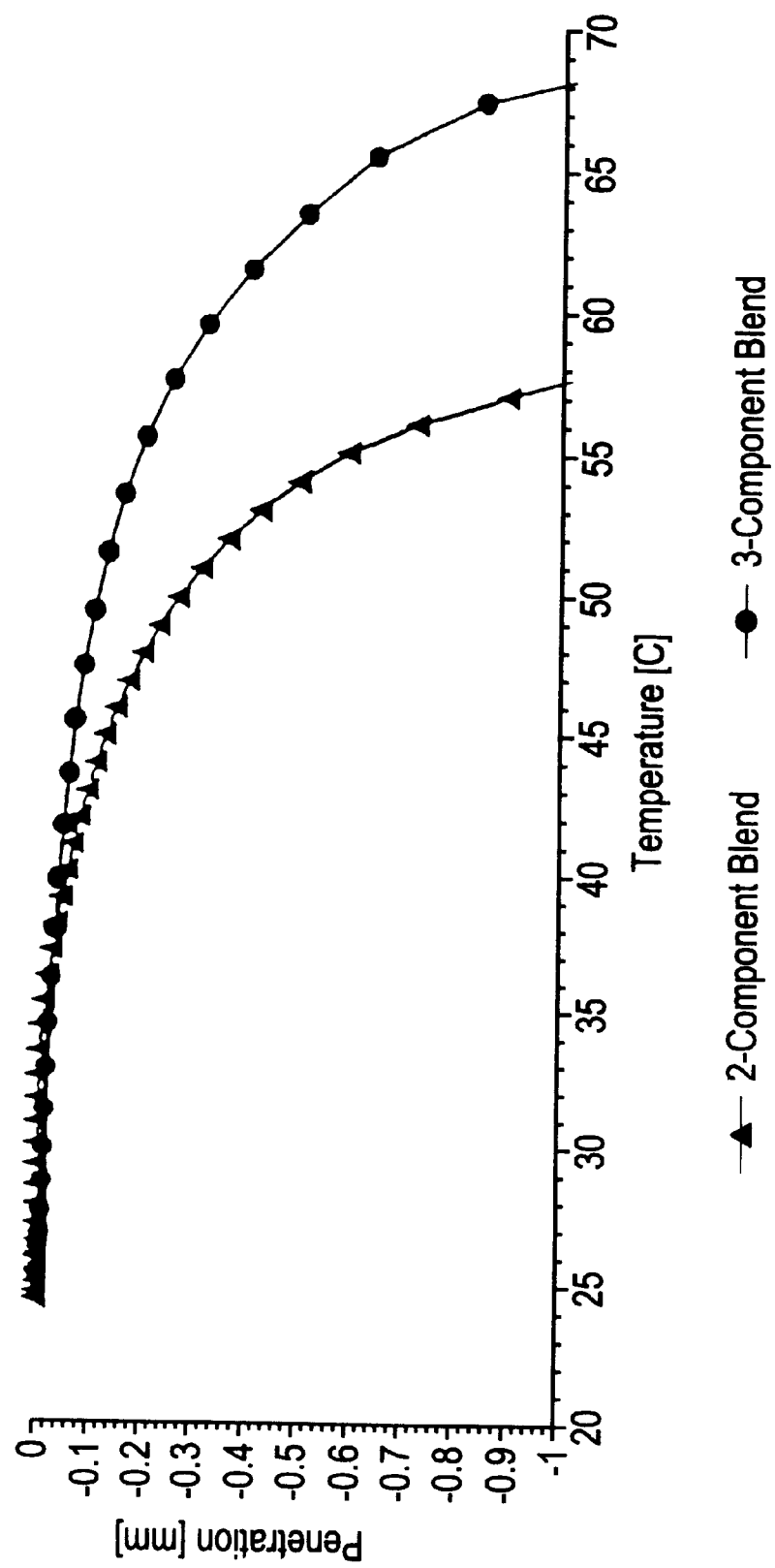
FIG. 12 shows thermomechanical analysis (TMA) of 2- and 3-component blends. The 2-component blend (labelled in FIG. 12) consists of 50% EG8200, 20% PF1140 and 30% Shellflex™ 371 oil and the 3-component blend (labelled in FIG. 12) consists of 30% EG8150, 14% PF1140, 3% IP-90, 23% $CaCO_3$ and 30% Shellflex™ 371 oil.

The elevated temperature resistance to penetration was measured by thermomechanical analysis (TMA). The effect of an additional component to the blend improves the elevated temperature performance of the compound. Addition of the filler had no effect on the TMA results. FIG. 12 shows the TMA of the binary and ternary polymer blend compounds.

Figure 13:
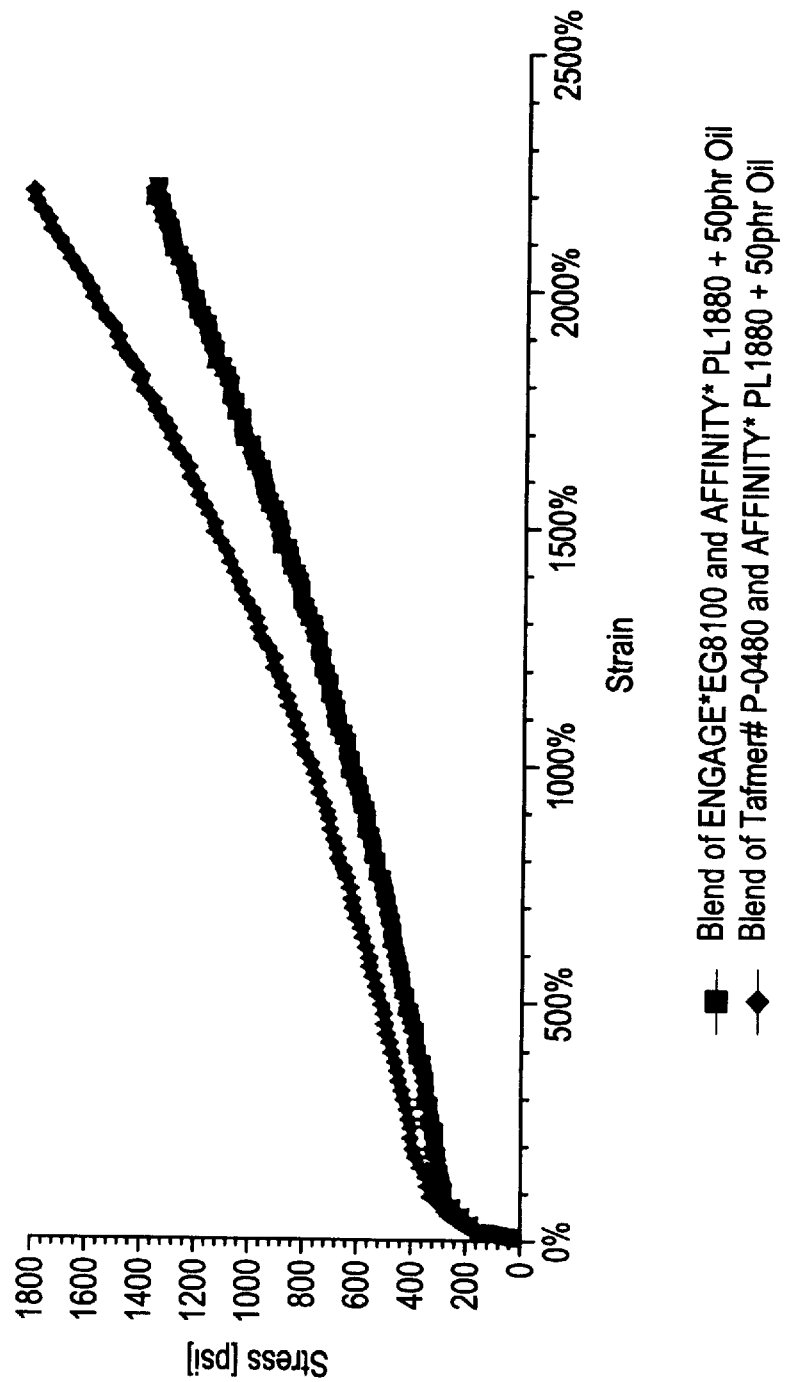
FIG. 13 shows stress-strain behavior at room temperature of blends made from different comonomer polymers of the lower density component, both containing oil. One blend consisted of Dow Chemical ENGAGE™ EG8100 having a melt index of 1.0 g/10 min. and a density of 0.87 g/cc and Dow Chemical's AFFINITY™ PL1880 having a melt index of 1.0 g/10 min. and a density of 0.902 g/cc. The other blend consisted of Mitsui Petrochemical's TAFMER™ PO480 having a melt index of 1.0 g/10 min. and a density of 0.87 g/cc and Dow Chemical's AFFINITY™ PL1880 (described above). Each blend was combined with 50 phr oil.
Figure 14:
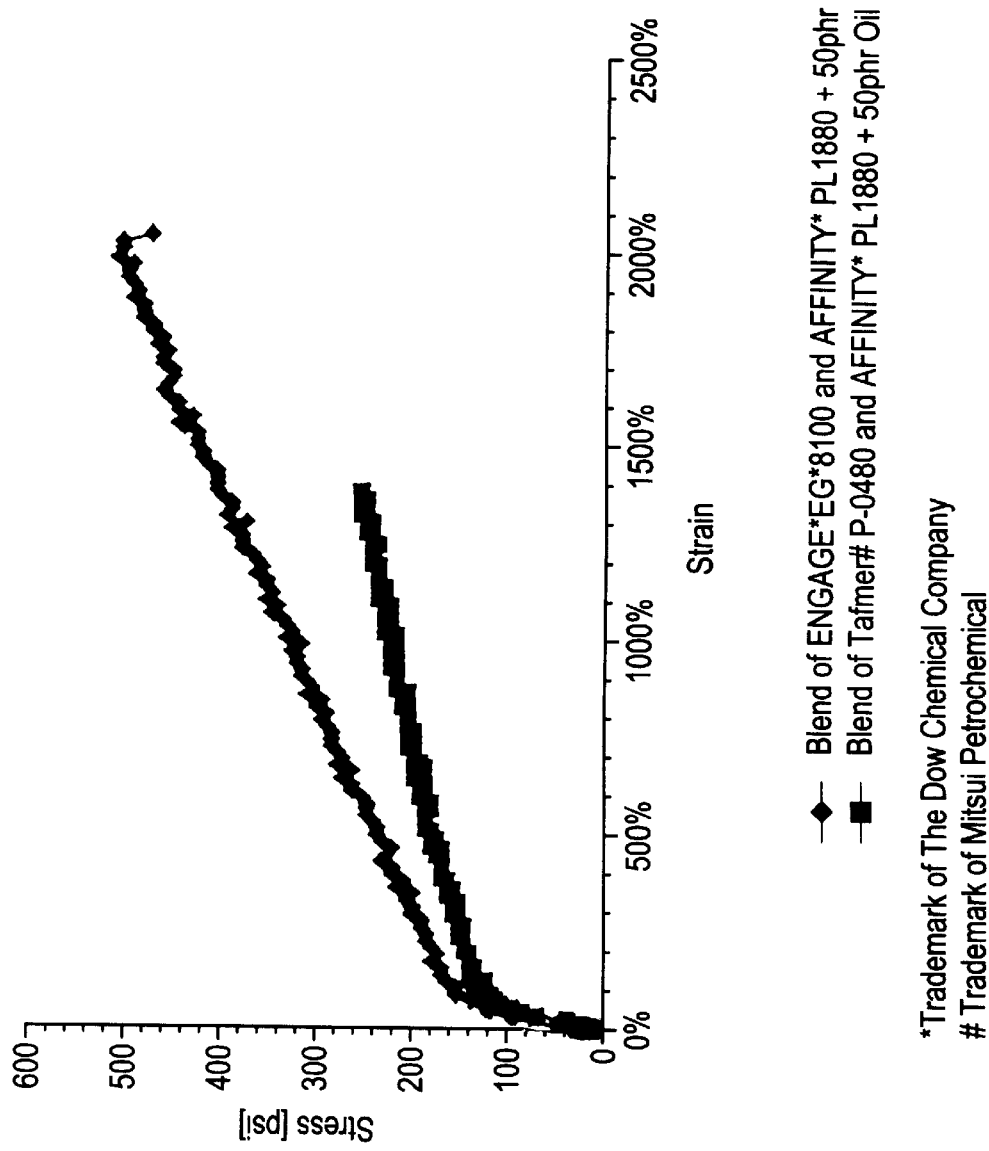
FIG. 14 shows stress-strain behavior at elevated temperature (60° C.) for the same blends made from different comonomer polymers of the lower density component as in FIG. 13.
Figure 15:
FIG. 15 shows peak stress at ambient and elevated temperature (60° C.) of the blends made from different comonomer polymers of the lower density component.

FIG. 13 shows the stress-strain behavior of the blends made with the different comonomer in the lower density component (with oil) run at room temperature. FIG. 14 shows the stress-strain behavior of the same blends (with oil) run at 60° C. At both temperatures, the blend that contained the octene copolymer showed improved tensile properties. FIG. 15 shows the peak stress at ambient and elevated temperature stress-strain analysis.

The effect of blending poymers with different density (crystallinity content) to get the same MI and density as a straight resin also shows an advantage in the blend's ability to retain oil to lower temperatures before bleed-out as observed by the cigarette paper weight gain method. Table V below lists the samples, the target MI and density of the polymer and blends and the observations made during the experiments. The samples are allowed to equilibrate at the temperature listed in the table and the weight gain of the cigarette paper monitored. A "Y" in the table means that the paper increases in weight by a value greater than 2% and the excess oil bleeds out of the sample.

TABLE VI

Components of the Blends Listed in Table 3

| Sample | Blend Components |
|---|---|
| 53215-26-18 | 1MI, 0.885 g/cc + 1MI, 0.915 g/cc |
| 53215-26-14 | 1MI, 0.87 g/cc + 1.6MI, 0.895 g/cc |
| 53215-26-8 | 0.5MI, 0.863 g/cc + 1.6MI, 0.895 g/cc |
| 53215-26-19 | 0.5MI, 0.858 g/cc + 1MI, 0.915 g/cc |
| 53215-26-17 | 0.5MI, 0.863 g/cc + 1.6MI, 0.895 g/cc |

The results show that the blends are able to go to lower temperatures before the oil bleeds out compared to the same MI and density single polymer compound.

Figure 16:
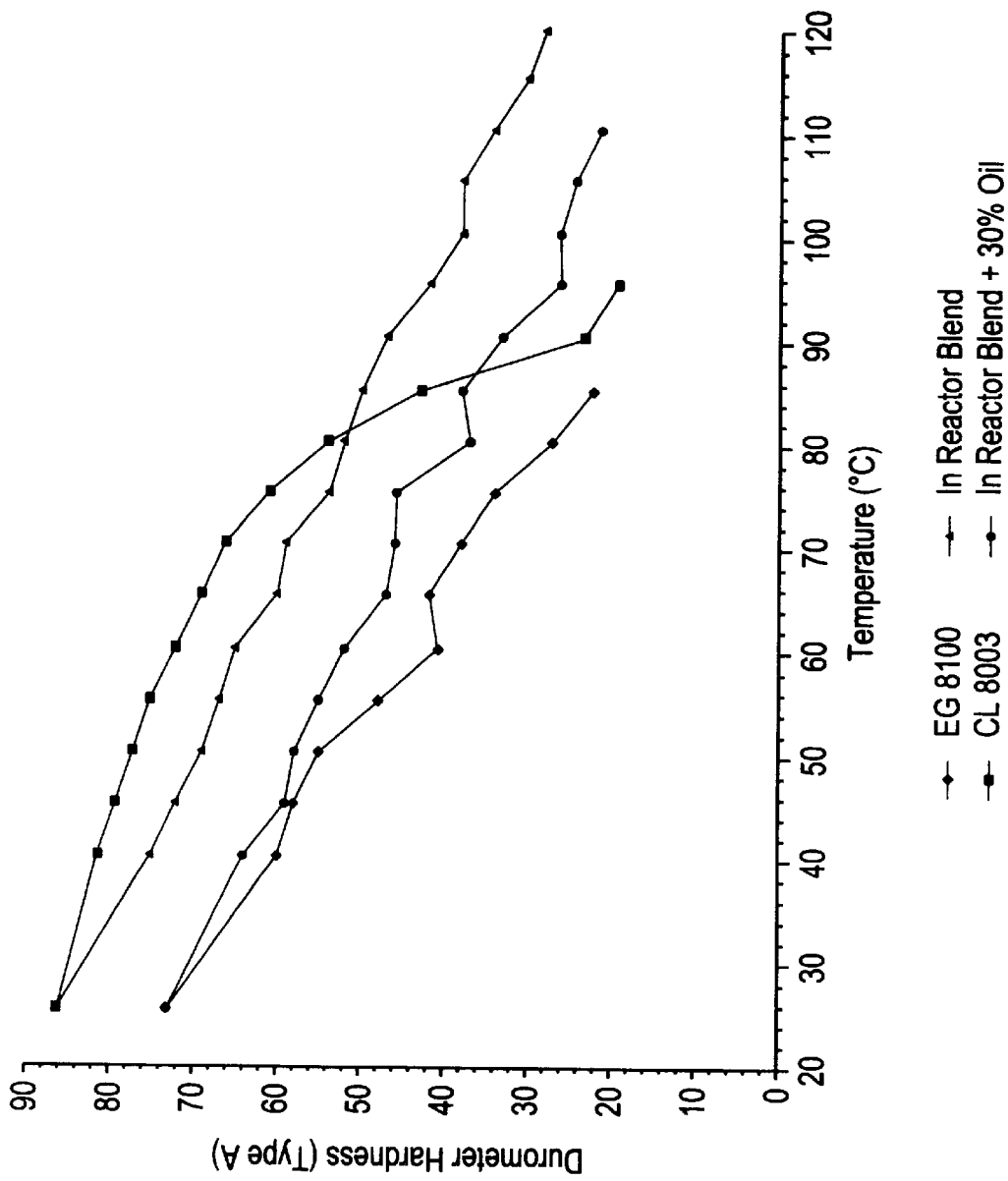
FIG. 16 shows hardness versus temperature for two polymers individually, a dual reactor polymer composition without oil and the same dual reactor polymer composition with 30 percent oil. EG8100 is the same as above and CL8003 is a polymer available from The Dow Chemical Company having a melt index of 1.0 g/10 min. and a density of 0.885 g/cc.

FIG. 16 shows that at temperatures the in-reactor polymer blend retains Shore A hardness substantially better than the individual polymer components. This property is displayed even when 30 percent oil is added to the blend. This shows that softness can be increased and polymer consumption can be reduced by adding oil to the blends according to this invention and still achieve sufficient hardness at elevated temperatures.

Illustrative examples of how to make ultra-low molecular weight ethylene polymers are provided below.

Catalyst Preparation

Part 1: Preparation of $TiCl_3 (DME)_{1.5}$

The apparatus (referred to as R-1) was set-up in the hood and purged with nitrogen; it consisted of a 10 L glass kettle with flush mounted bottom valve, 5-neck head, teflon

TABLE V

Low Temperature Oil Loss Experimental Results

| | Description | Temperature (° C.) | | | | |
|---|---|---|---|---|---|---|
| | Target Melt Index (MI) and Density [g/cc] | 23 | 5 | 0 | −12 | −23 |
| 53215-26-16 | 1MI, 0.895 g/cc Straight Resin + 15% oil | Y | | | | |
| 53215-26-18 | 1MI, 0.895 g/cc Blend + 15% oil | N | N | Y | | |
| 53215-26-11 | 1MI, 0.885 g/cc Straight Resin + 30% oil | Y | | | | |
| 53215-26-14 | 1MI, 0.885 g/cc Blend + 30% oil | N | Y | | | |
| 53215-26-4 | 1MI, 0.87 g/cc Straight Resin + 50% oil | N | Y | | | |
| 53215-26-8 | 1MI, 0.87 g/cc Blend #1 + 50% oil | N | N | N | N | Y |
| 53215-26-19 | 1MI, 0.87 g/cc Blend #2 + 50% oil | N | N | N | Y | |
| 53215-26-3 | 1MI, 0.87 g/cc Straight Resin + 30% oil | N | N | N | N | Y |
| 53215-26-17 | 1MI, 0.87 g/cc Blend #1 + 30% oil | N | N | N | N | N | gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5.2 L). In the drybox, 300 g of $TiCl_3$ was weighed into an equalizing powder addition funnel; the funnel was capped, removed from the drybox, and put on the reaction kettle in place of the stopper. The $TiCl_3$ was added over about 10 minutes with stirring. After the addition was completed, additional DME was used to wash the rest of the $TiCl_3$ into the flask. This process was then repeated with 325 g of additional $TiCl_3$, giving a total of 625 g. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The $TiCl_3(DME)_{1.5}$ was left in R-1 as a pale blue solid.

Part 2: Preparation of $[(Me_4C_5)SiMe_2N\text{-}t\text{-}Bu][MgCl]_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 7 L of toluene, 3.09 kg of 2.17 M i-PrMgCl in $Et_2O$, 250 mL of THF, and 1.03 kg of $(Me_4C_5H)SiMe_2NH\text{-}t\text{-}Bu$. The mixture was then heated, and the ether allowed to boil off into a trap cooled to $-78°$ C. After three hours, the temperature of the mixture had reached 80° C., at which time a white precipitate formed. The temperature was then increased to 90° C. over 30 minutes and held at this temperature for 2 hours. At the end of this time, the heater was turned off, and 2 L of DME was added to the hot, stirring solution, resulting in the formation of additional precipitate. The solution was allowed to cool to room temperature, the material was allowed to settle, and the supernatant was decanted from the solid. An additional wash was done by adding toluene, stirring for several minutes, allowing the solids to settle, and decanting the toluene solution. The $[(Me_4C_5)SiMe_2N\text{-}t\text{-}Bu][MgCl]_2$ was left in R-2 as an off-white solid.

Part 3: Preparation of $[(\eta^5\text{-}Me_4C_5)SiMe_2N\text{-}t\text{-}Bu]Ti(h4\text{-}1,3\text{-}pentadiene)$ The materials in R-1 and R-2 were slurried in DME (the total volumes of the mixtures were approx. 5 L in R-1 and 12 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color. After 15 minutes, 1050 mL of 1,3-pentadiene and 2.60 kg of 2.03 M n-BuMgCl in THF were added simultaneously. The maximum temperature reached in the flask during this addition was 53° C. The mixture was stirred for 2 hours, then approx. 11 L of solvent was removed under vacuum. Hexane was then added to the flask to a total volume of 22 L. The material was allowed to settle, and the liquid layer (12 L) was decanted into another 30 L glass kettle (R-3). An additional 15 liters of product solution was collected by adding hexane to R-2, stirring for 50 minutes, again allowing to settle, and decanting. This material was combined with the first extract in R-3. The solvent in R-3 was removed under vacuum to leave a red/black solid, which was then extracted with toluene. This material was transferred into a storage cylinder. Analysis indicated that the solution (11.75 L) was 0.255 M in titanium; this is equal to 3.0 moles of $[(\eta^5\text{-}Me_4C_5)SiMe_2N\text{-}t\text{-}Bu]Ti(\eta^4\text{-}1,3\text{-}pentadiene)$ or 1095 g. This is a 74% yield based on the titanium added as $TiCl_3$.

Synthesis of the Ultra-low Molecular Weight Polymer

The polymer products of Examples 1 and 2 were produced in a solution polymerization process using a well-mixed recirculating loop reactor. They were each stabilized with 2000 ppm IRGANOX 1076 hindered polyphenol stabilizer (available from Ciba-Geigy Corporation) and 35 ppm deionized water (as a catalyst kill agent).

The ethylene and the hydrogen (as well as any ethylene and hydrogen which are recycled from the separator, are combined into one stream before being introduced into the diluent mixture, a mixture of $C_8$–$C_{10}$ saturated hydrocarbons, e.g., ISOPAR E (available from Exxon Chemical Company) and the comonomer 1-octene.

The metal complex and cocatalysts are combined into a single stream and are also continuously injected into the reactor. The catalyst is as prepared in the Catalyst Description set forth above, the primary cocatalyst is tri (pentafluorophenyl)borane, available from Boulder Scientific as a 3 wt % solution in ISOPAR-E mixed hydrocarbon, and the secondary cocatalyst is triisobutyl aluminum-modified methylalumoxane (MMAO Type 3A), available from Akzo Nobel Chemical Inc. as a solution in heptane having 2 wt % aluminum.

Sufficient residence time is allowed for the metal complex and cocatalyst to react prior to introduction into the polymerization reactor. The reactor pressure is held constant at about 475 psig. After polymerization, the reactor exit stream is introduced into a separator where the molten polymer is separated from the unreacted comonomer(s), unreacted ethylene, unreacted hydrogen, and diluent mixture stream, which are in turn recycled for combination with fresh comonomer, ethylene, hydrogen, and diluent, for introduction into the reactor. The molten polymer is subsequently strand chopped or pelletized, and, after being cooled in a water bath or pelletizer, the solid pellets are collected. Table III describes the polymerization conditions and the resultant polymer properties.

TABLE VII

| | Ex. 1 | Ex. 2 |
|---|---|---|
| Ethylene fresh feed rate (lbs/hr) | 140 | 140 |
| Total ethylene feed rate (lbs/hr) | 146.17 | 146.5 |
| Fresh octene feed rate (lbs/hr) | 49.5 | 12.67 |
| Total octene feed rate (lbs/hr) | 112 | 32.9 |
| Total octene concentration (weight %) | 11.4 | 3.36 |
| Fresh hydrogen feed rate (standard $cm^3$/min) | 5350 | 16100 |
| Solvent and octene feed rate (lbs/hr) | 839.4 | 840 |
| Ethylene conversion rate (wt %) | 90.3 | 88.26 |
| Reactor temperature (°C.) | 119.8 | 134.3 |
| Feed temperature (°C.) | 15 | 15.3 |
| Catalyst concentration (ppm) | 70 | 70 |
| Catalyst flow rate (lbs/hr) | 1.265 | 4.6 |
| Primary cocatalyst concentration (ppm) | 2031 | 1998 |
| Primary cocatalyst flow rate (lbs/hr) | 1.635 | 5.86 |
| Primary cocatalyst to catalyst molar ratio | 3.48 | 2.897 |
| Secondary cocatalyst concentration (ppm) | 198 | 198 |
| Secondary cocatalyst flow rate (lbs/hr) | 1.258 | 3.7 |
| Secondary cocatalyst to catalyst molar ratio | 4.986 | 4.037 |
| Product density (g/$cm^3$) | 0.8925 | 0.9369 |
| Product melt viscosity at 350° F. (centipoise) | 4,000 | 400 |
| Polymer melt index ($I_2$ at 190 C) | 1,900* | 14,000 |
| Polymer $M_n$ | 8,900* | 4,700* |

Although the invention has been described in considerable detail through the preceding specific embodiments, it is to be understood that these embodiments are for purposes of illustration only. Many variations and modifications can be made by one skilled in the art without departing from the spirit and scope of the invention.

What is claimed is:

1. A polymer mixture comprising
   (A) at least one homogeneously branched ethylene/α-olefin interpolymer having a crystallinity in the range from 0 to 30% and
   (B) at least one ethylene polymer having a crystaliinity up to 60% which is at least 7% greater than the crystallinity of component (A),
   wherein
   the number average molecular weight of component (B) is greater than or equal to the number average molecular weight of polymer (A);
   the weight ratio of component (A) to component (B) is greater than 60:40;
   the polymer mixture has an overall crystallinity in the range from 6 to 30%;
   when component (A) and component (B) are both ethylene/α-olefin copolymer, component (B) consists essentially of ethylene and at least one α-olefin; and
   when (a) component (B) does not comprise at least one interpolymer of ethylene with at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof, (b) none of the ethylene polymer components of the polymer mixture comprise an ultra-low molecular weight ethylene polymer having a crystallinity from 0 to 80%, a melt viscosity at 350° F. up to 8200 cp and a molecular weight distribution from 1.5 to 2.5, and (c) the overall crystallinity of the polymer mixture is greater than or equal to 21.5%, then the polymer mixture has a molecular weight distribution not greater than 3.

2. The polymer mixture of claim 1 further comprising:
   (C) at least one homogeneously branched ethylene polymer having a crystallinity between the crystallinities of components (A) and (B) and having a crystallinity which differs from the crystallinities of components (A) and (B) by at least 7%.

3. The polymer mixture of claim 2 wherein the crystallinity of component (B) is at least 30% greater than the crystallinity of component (A).

4. The polymer mixture of claim 1 wherein component (A) is at least one SLEP wherein the SLEP has
   i. a melt flow ratio, $I_{10}/I_2 \geq 5.63$,
   ii. a molecular weight distribution, Mw/Mn, as determined by gel permeation chromatography and defined by the equation:

$$(M_w/M_n) < (I_{10}/I_2) - 4.63,$$

iii. a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density within ten percent of the SLEP and wherein the respective critical shear rates of the SLEP and the linear ethylene polymer are measured at the same melt temperature using a gas extrusion rheometer, and
   iv. a single differential scanning calorimetry, DSC, melting peak between −30 and 150° C.

5. The polymer mixture of claim 4 wherein component (B) is at least one SLEP wherein the SLEP has
   i. a melt flow ratio, $I_{10}/I_2 \geq 5.63$,
   ii. a molecular weight distribution, Mw/Mn, as determined by gel permeation chromatography and defined by the equation:

$$(M_w/M_n) < (I_{10}/I_2) - 4.63,$$

iii. a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density within ten percent of the SLEP and wherein the respective critical shear rates of the SLEP and the linear ethylene polymer are measured at the same melt temperature using a gas extrusion rheometer, and
   iv. a single differential scanning calorimetry, DSC, melting peak between −30 and 150° C.

6. The polymer mixture of claim 2 wherein component (A) and component (C) are each at least one SLEP has
   i. a melt flow ratio, $I_{10}/I_2 \geq 5.63$,
   ii. a molecular weight distribution, Mw/Mn, as determined by gel permeation chromatography and defined by the equation:

$$(M_w/M_n) < (I_{10}/I_2) - 4.63,$$

iii. a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density within ten percent of the SLEP and wherein the respective critical shear rates of the SLEP and the linear ethylene polymer are measured at the same melt temperature using a gas extrusion rheometer, and
   iv. a single differential scanning calorimetry, DSC, melting peak between −30 and 150° C.

7. The polymer mixture of claim 4, wherein the SLEP has 0.01 to 3 long chain branches/1000 carbons.

8. The polymer mixture of claim 7, wherein the SLEP has up to 1 long chain branch/1000 carbons.

9. The polymer mixture of claim 1 wherein component (A) has less than 0.01 long chain branch/1000 carbons.

10. The polymer mixture of claim 2 wherein component (C) has less than 0.01 long chain branch/1000 carbons.

11. The polymer mixture of claim 1, wherein at least one of component (A) or component (B) is an interpolymer of ethylene and at least one α-olefin selected from the group consisting of 1-propylene, 1-butene, 1-isobutylene, 1-hexene, 4-methyl-1-pentene, 1-pentene, 1-heptene and 1-octene.

12. The polymer mixture of claim 11, wherein at least one of component (A) or component (B) is a copolymer of ethylene and 1-octene.

13. The polymer mixture of claim 1, wherein at least one component (A) or component (B) is a terpolymer of ethylene, propylene and a non-conjugated diene.

14. The polymer mixture of claim 13, wherein the non-conjugated diene is selected from the group consisting of 1,4-hexadiene, dicyclopentadiene, 5-ethylidene-2-norbornene, 5-methylene-2-norbornene, 7-methyl-1,6-octadiene, piperylene, and 4-vinylcyclohexene.

15. The polymer mixture of claim 1 wherein component (A) is an ethylene propene or an ethylene butene or an ethylene hexene and component (B) is an ethylene octene.

16. The polymer mixture of claim 1 further comprising an oil.

17. A process for making a molded article comprising:
   (A) heating a polymer mixture according to claim 1 to a temperature suitable for injection molding;
   (B) injecting the polymer mixture of step (A) into a mold to form the molded article; and
   (C) removing from the mold the molded article formed in steps (B).

18. The process of claim 17 further comprising:
   (B1) cooling the polymer mixture of step (B),
wherein the cooling time period of step (B1) is at least 20 percent less than the cooling time period of step (B1) conducted under the same conditions with a single ethylene polymer made of the same monomer components as component (A) having the same crystallinity and melt index as the polymer mixture.

19. The process of claim 17 wherein component (A) of the polymer mixture is a substantially linear ethylene polymer.

20. The process of claim 17 wherein component (A) is produced in a first reaction vessel, component (B) is produced in a second reaction vessel operating simultaneously with the first reaction vessel and interconnected with the first reaction vessel such that component (A) is continuously mixed with component (B) as components (A) and (B) are being produced.

21. A molded article obtainable by forming a polymer mixture of claim 1 into a shape and causing the shaped polymer mixture to become fixed in shape.

22. The article of claim 21 wherein the shaped polymer mixture has at least two differential scanning calorimetry melting peaks and lacks a differential scanning calorimetry peak above 115° C.

23. The article of claim 21 wherein the shaped polymer mixture has a softening point under load of at least about 80° C., a 100% modulus of elasticity of at least 140 psi, a compression set of less than 80% at 70° C., an overall crystallinity less than 21.5% and a crosslink density less than 20% gel.

24. The article of claim 21 wherein the shaped polymer mixture has a crosslink density of at least 50% gel.

25. The polymer mixture of claim 1 wherein the crystallinity of component (B) is at least 10%.

26. The polymer mixture of claim 1 wherein the combined weight of components (A) and (B) is at least 60 weight-percent of the combined weight of the polymers in the polymer mixture and the polymer mixture has a molecular weight distribution not greater than 3.

* * * * *